United States Patent [19]

Tokunaga

[11] Patent Number: 5,671,447
[45] Date of Patent: Sep. 23, 1997

[54] LINE-OF-SIGHT DETECTING DEVICE AND APPARATUS INCLUDING THE SAME

[75] Inventor: Tatsuyuki Tokunaga, Yono, Japan

[73] Assignee: Canon Kabushiki Kaisha, Tokyo, Japan

[21] Appl. No.: 506,549

[22] Filed: Jul. 25, 1995

[30] Foreign Application Priority Data

Jul. 26, 1994 [JP] Japan ................... 6-192692

[51] Int. Cl.$^6$ .................................. G03B 17/00
[52] U.S. Cl. .................................. 396/51
[58] Field of Search ................. 354/400–409, 354/410; 396/51

[56] References Cited

U.S. PATENT DOCUMENTS 5,144,358  9/1992  Tsuru et al. ................. 354/403
5,455,654  10/1995  Suzuki ........................ 354/402

FOREIGN PATENT DOCUMENTS

A2273991  7/1994  United Kingdom .

OTHER PUBLICATIONS

U.S. application No. 08/331,154, filed Oct. 28, 1994, allowed.
U.S. application No. 08/464,224, filed Jun. 5, 1995, pending.
U.S. application No. 08/387,614, filed Feb. 13, 1995, pending.
U.S. application No. 08/207,095, filed Mar. 8, 1994, pending.

*Primary Examiner*—Safet Metjahic
*Assistant Examiner*—Eric Nelson
*Attorney, Agent, or Firm*—Fitzpatrick, Cella, Harper & Scinto

[57] ABSTRACT

A line-of-sight detecting device includes an area sensor composed of a plurality of photoelectric conversion elements for receiving an image of an eyeball of a viewer. The area sensor is divided into block areas each having some of the plurality of photoelectric conversion elements, each block area outputs a value on the basis of the output of the photoelectric conversion elements constituting that block area. A particular block area satisfying predetermined conditions based on the output values of the block areas is selected from the plurality of block areas. Image processing is performed on those photoelectric conversion elements which are in a predetermined range based on the position of the particular block area to thereby detect the line of sight of the viewer, wherein the number of photoelectric conversion elements constituting each block area is changed in accordance with a predetermined situation.

38 Claims, 26 Drawing Sheets

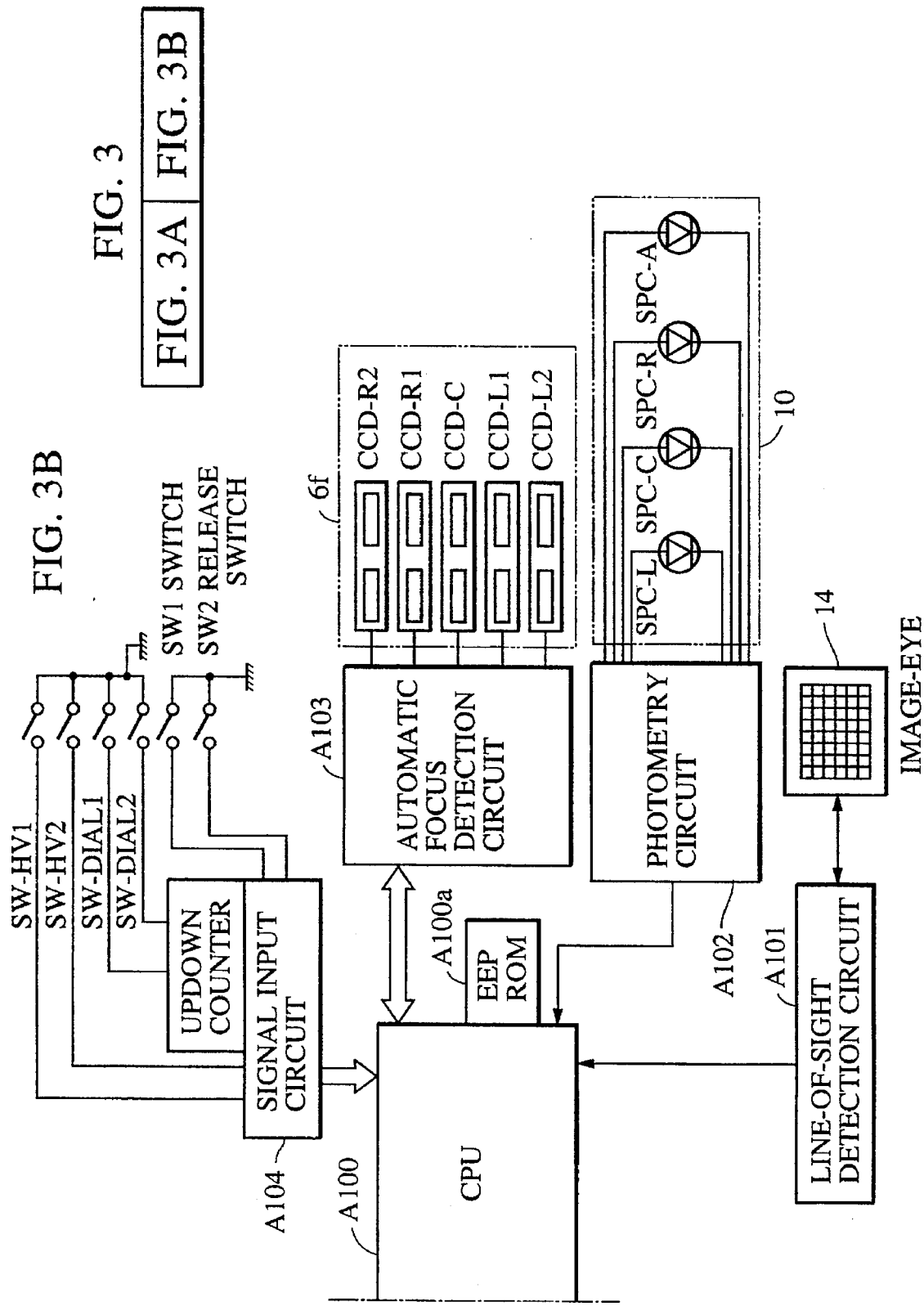

| FIG. 4A | FIG. 4B |

FIG. 10

(#300) PUPIL EDGE DETECTION (#301) I=IL1∼IL2

(#302) ANY EDGE POINT NEAR IM(1,2) ? — YES →

NO ↓

(#303) EDGE CONDITION 1 SATISFIED ? — YES →

NO ↓

(#304) EDGE CONDITION 2 SATISFIED ? — YES →

NO ↓

(#305)
EDGDT (EDGCNT, 1) ← IM(1,2)
EDGDT (EDGCNT, 2) ← 1
EDGDT (EDGCNT, 3 ← J-2
EDGCNT ← EDGCNT+1

(#306) RETURN

FIG. 14(A)

(#700) RECOMPUTATION 1 OF ESTIMATION OF LEAST SQUARE OF CIRCLE

(#701)
XS1 ← X1, XS2 ← X2
XS3 ← X3, XS4 ← X4
YS1 ← Y1, YS2 ← Y2
YS3 ← Y3, YS4 ← Y4
ZS1 ← Z1, ZS2 ← Z2
ZS3 ← Z3, ZS4 ← Z4
M ← N/5

(#702) INITIALIZE WORK

(#703) L ← 0 ~ (EDGCNT−1)

(#704) EDGE POINT(X, Y) EFFECTIVE ? — NO (#705) CALCULATION OF
{ X1, X2, X3, X4
  Y1, Y2, Y3, Y4
  Z1, Z2, Z3, Z4 }
N ← N+1

(#706) N > M — YES / NO (#708) CALCULATE { CIRCLE CENTER(A, B)
                   ERROR AMOUNT ER' }

(#709) RETURN

FIG. 14(C)

(#720)
RECOMPUTATION 3 OF ESTIMATION OF LEAST SQUARE OF CIRCLE

↓

(#721)
REARRANGE EDGE DATA "EDGDT"

(#730)
RECOMPUTATION 4 OF ESTIMATION OF LEAST SQUARE OF CIRCLE

↓

(#711)

ESTIMATION OF LEAST
SQUARE OF CIRCLE

OBTAINING
RADIUS $r_c$
WHEN CENTER
OF PUPIL CIRCLE
IS $(X_c, Y_c)$

LINE-OF-SIGHT DETECTING DEVICE AND APPARATUS INCLUDING THE SAME

BACKGROUND OF THE INVENTION

1. Field of the Invention

The present invention relates to a line-of-sight detecting device for detecting the line of sight of a viewer and to an improvement of an apparatus having a line-of-sight detecting device.

2. Description of the Related Art

There have been proposed various devices for detecting which part of an observation surface is being observed by a viewer, i.e., the position where the line of sight of the viewer is directed. For example, according to U.S. application Ser. No. 07/327,784 (filed on Mar. 23, 1989 by the present applicant, which was abandoned in lieu of continuation U.S. application Ser. No. 07/671,656, which was abandoned in lieu of continuation U.S. application Ser. No. 08/003,954, which was abandoned in lieu of Ser. No. 08/331,154, now allowed), a parallel luminous flux from a light source is projected onto the front portion of the eyeball of the photographer to obtain the point of fixation by utilizing the corneal reflex image due to a reflection from the cornea and the image forming position of the pupil. Specifically, such a line-of-sight detecting device is provided in a single-lens reflex camera, where an automatic focusing of the photographic lens is effected on the basis of information regarding the line of sight (point of fixation) of the photographer.

FIG. 19 is a schematic diagram illustrating, as a prior-art example, a camera having a line-of-sight detecting device. The diagram shows a detection optical system provided in a single-lens reflex camera.

In the drawing, numeral 11 indicates an eyepiece. The photographer observes an object through the finder, with his eye close to this eyepiece 11. Numerals 13a and 13b indicate light sources (hereinafter referred to as "IRED"), such as light emitting diodes, for emitting infrared rays, which are invisible to the photographer. Part of the illuminating light reflected by the eyeball of the photographer is gathered on an image sensor 14 by a light-receptive lens 12.

FIG. 20 is a diagram for illustrating the principle on which the line-of-sight detection in the prior art is based.

In the drawing, numeral 15 indicates the eyeball of the photographer; numeral 16 indicates the cornea; and numeral 17 indicates the iris. The eyepiece 11 shown in FIG. 19 is omitted since it is not needed for the explanation of the principle.

The conventional line-of-sight detecting method will now be described with reference to the above drawings.

Infrared radiation emitted from the IRED 13b impinges upon the cornea 16 of the eyeball 15 of the viewer. At this time, part of the infrared radiation reflected by the surface of the cornea 16 forms a corneal reflex image d (virtual image), which is condensed by the light-receptive lens 12 to form an image at position d' on the image sensor 14. Similarly, infrared radiation emitted from the IRED 13a illuminates the cornea 16 of the eyeball 15. At this time, the corneal reflex image e, formed by part of the infrared radiation reflected by the surface of the cornea 16, is condensed by the light-receptive lens 12 to form an image at position e' on the image sensor 14.

Luminous fluxes from edge portions a and b of the iris 17 form images of these edge portions a and b at positions a' and b' of the image sensor 14. Assuming that the X-coordinate of the center c of the circle defined by the boundary between the pupil and the iris 17 (which circle is referred to as "pupillary circle") is Xc, its X-coordinate on the image sensor 14 is Xc' (not shown).

FIG. 21(A) is a schematic diagram of the eyeball image projected onto the image sensor 14, and FIG. 21(B) is a diagram showing the intensity distribution of an output signal 60 from the output line of the image sensor 14.

In FIG. 21(A), numeral 50 indicates the white of the eyeball; numeral 51 indicates the pupil portion; and numerals 52a and 52b indicate corneal reflex images of the pair of IREDs. Hereinafter, the corneal reflex images 52a and 52b, which are called "first Purkinje images", will be referred to as "Purkinje images".

The X-coordinate of the middle point of the Purkinje images d and e and the X-coordinate Xo of the center of curvature o of the cornea 16 substantially coincide with each other. Thus, assuming that the X-coordinates of the positions of generation d and e of the Purkinje images are Xd and Xe, and that the the standard distance between the center of curvature o of the cornea 16 and the center c of the pupil is $L_{OC}$, the angle of rotation θx of the optical axis 15a of the eyeball 15 substantially satisfies the equation:

$$L_{OC}* \sin θx = (Xd+Xe)/2 - Xc \qquad (1)$$

Thus, as shown in FIG. 21(A), by detecting the positions of feature points (the centers of Purkinje images and the pupil) of the eyeball 15 as projected onto the image sensor 14, it is possible to obtain the angle of rotation θ of the optical axis 15a of the eyeball 15.

From equation (1), the angle of rotation of the optical axis 15a of the eyeball 15 can be obtained as follows:

$$β*L_{OC}* \sin θx = \{(Xpo-δX)-Xic\}* \text{pitch} \qquad (2)$$

$$β*L_{OC}* \sin θy = \{(Ypo-δY)-Yic\}* \text{pitch} \qquad (3)$$

where symbol θx indicates the angle of rotation in the Z-X plane of the optical axis of the eyeball, and symbol θy indicates the angle of rotation in the Y-Z plane of the optical axis of the eyeball. (Xpo, Ypo) represents the coordinates of the middle point of the two Purkinje images on the image sensor 14, and (Xic, Yic) represents the coordinates of the center of the pupil on the image sensor 14. The term "pitch" means the pixel pitch of the image sensor 14. Symbol β indicates the magnification in image formation, which is determined by the position of the eyeball 15 with respect to the light-receptive lens 12. Practically, it is obtained as a function of the distance between the two Purkinje images. Symbols δx and δy indicate correction terms for correcting the coordinates of the middle point of the Purkinje images. The correction terms are used for the purpose of correcting the errors attributable to the fact that the eyeball of the photographer is being illuminated with a divergent beam of light instead of a parallel beam. Symbol δY includes a correction term for correcting an offset component attributable to the fact that the eyeball of the photographer is being illuminated from the direction of the lower eyelid with a divergent beam.

When the angle of rotation (θx, θy) of the eyeball optical axis of the photographer has been calculated, the point of fixation (X, Y) of the photographer on the viewing plane (focusing plate) is obtained as follows, provided that the camera is in the horizontal position:

$$X = m*(θx+Δ) \qquad (4)$$

$$Y = m* θy \qquad (5)$$

The X-direction is a direction that is horizontal with respect to the photographer when the camera is in the horizontal position, and the Y-direction is a direction that is vertical with respect to the photographer when the camera is in the horizontal position. Symbol m indicates a transformation coefficient for transformation from the angle of rotation of the eyeball 15 to coordinates on the focusing plate, and symbol Δ indicates the angle that the optical axis 15a of the eyeball makes with the visual axis (the point of fixation). As is generally known, there is a horizontal deviation of approximately 5° with respect to the viewer between the angle of rotation of the eyeball and the actual visual axis, whereas there is substantially no such deviation in the vertical direction.

The calculation for obtaining the line of sight (point of fixation) of the photographer is executed by using software of a microcomputer in the line-of-sight detecting device on the basis of the above equations.

Then, the position on the focusing plate of the line of sight of the photographer looking through the finder of the camera is calculated, and the line-of-sight information thus obtained is utilized in the focusing of the photographic lens, the setting of the photographic mode of the camera, etc.

When actually obtaining the line of sight, the eyeball image on the image sensor is processed by a microcomputer or the like to detect the above-mentioned Purkinje images and pupillary circle, and on the basis of the positional information thereof, the line of sight is calculated.

A specific example of the calculation method is described in U.S. application Ser. No. 07/888,495 (filed on May 27, 1992 by the present applicant, which was abandoned in lieu of continuation U.S. application Ser. No. 08/387,614).

The method will be briefly described. First, the photoelectric conversion signals of all the pixels of the image sensor are read and undergo A/D conversion, and the coordinates of the Purkinje images and the pupillary circle are stored through sequential processing. The coordinates of the Purkinje images to be obtained are the coordinates when the luminance level of the pixels are recognized to be higher than a predetermined level. The pupillary circle is obtained through extraction by utilizing the difference in luminance between the pupil and the iris. Here, a judgment is made as to whether a point is to be regarded as an edge point from the minimum luminance value at the particular point in time in the sequential processing. Thus, when all the pixels have been read out to complete the sequential processing, the judgment as to whether the point is to be regarded as an edge point from the minimum luminance value of all the pixels. From the edge points thus confirmed to be such, a circle is assumed from the edge coordinates of the pupil obtained by the least square method. The circle thus obtained is regarded as the pupillary circle.

FIG. 22A shows an eyeball image, in which the Purkinje images are omitted. The white circles arranged around the pupil section 51 are pupillary edges, one of which is indicated by reference numeral 70-1.

FIG. 22B exclusively shows the pupillary edges of portion (A), shown in FIG. 22A. On the basis of the edge data thus obtained, a circle 72 is assumed by using the least square method. Assuming that the center coordinates of this assumed circle are (Xc, Yc) and that the radius of the circle is rc, the circle obtained will be as shown in FIG. 22(C).

When this line-of-sight detecting device is used for the purpose of detecting the line of sight of the viewer looking through the finder of the camera, it is absolutely necessary to provide a certain degree of freedom regarding the way the viewer looks through the finder. That is, it is desirable for the line of sight to be capable of being correctly detected even if there is a slight change in the way the viewer looks through the finder. For this purpose, it is necessary for the area of the image received by the area sensor to be large. However, that leads to an increase in the number of pixels of the area sensor, with the result that an enormous amount of operation is required for the reading of the signals for line-of-sight detection and for the extraction of the pupillary edges, the Purkinje images, etc. Thus, an enormous amount of time is required.

Apart from the above problem, if a ghost or flare arises from the line-of-sight detection optical system, or, when the viewer is wearing glasses, a noise component, such as a reflex image from spectacles, etc. is present, it is possible that the wrong pupillary images may be detected, resulting in a deterioration in the reliability in the detection of the pupillary circle.

Further, generally speaking, the storage capacity of the built-in RAM of microcomputers used for the control of cameras is not large enough to be capable of storing the entire pixel information of the area sensor at one time. In view of this, image data corresponding to several lines is first stored in the built-in RAM, and then sequential processing is performed while executing reading for each line of the area sensor. When the sequential processing of all the pixels has been completed, edge point judgment is made again, whereby an improvement is achieved in terms of the reliability in the detection of the pupillary circle. Since the eyeball image is processed in the manner as described above, a lot of time has to be spent on the processing.

In view of this, the present applicant proposed, in U.S. application Ser. No. 08/207,095 (filed on Mar. 8, 1994), a device for detecting the line of sight of a viewer, which utilizes the fact that the photoelectric conversion signal is at the lowest level in its portion corresponding to the pupil image because those pixels of the eyeball image which correspond to the the pupil are the darkest [FIG. 21(B)]. To utilize this fact, the entire area of the image sensor is divided into a plurality of substantially uniform block areas, and a block signal output means for outputting block signals related to the block signals in these block areas is provided. The block which exhibits a block signal that is at the lowest level is detected. On the basis of the position of this block, a limitation area is set in the image sensor area, and signal processing is performed solely with respect to this area on the basis of the photoelectric signal. That is, only that pupil portion, which is necessary for line-of-sight signal detection is selected, and that portion is exclusively subjected to signal processing, so that it is possible to expedite the line-of-sight detection. Further, in the device, the block signal, which is at the lowest level, is used to detect the pupillary circle by signal processing on the basis of the photoelectric conversion signal of the pixels in the limitation area, so that, even if the additional edge point judgment at the time of completion of the sequential processing of all the pixels is omitted, a substantial increase in the speed of the line-of-sight detection processing is thereby realized without deteriorating the reliability of the pupillary edge extraction.

In the above-described method, however, the size of the blocks into which the entire area of the image sensor is separated, entails a problem. For example, when the entire area is separated into blocks having a size much larger than that of the pupil image, the difference in level between the blocks which include any pupil portion and the blocks which do not is rather small, so that the detection of the block exhibiting the lowest level is rather difficult to perform. That is, if there exists a block which is completely occupied by the pupil image, the output from that block will be at the lowest level, which is much lower than the output level of the blocks including image portion other than the pupil section. Conversely, if an image portion other than the pupil image, for example, an iris portion, is contained in a block, the level of the output from that block will be higher than that of the block containing pupil image portion only. In other words, the difference in output level between a block including pupil portion and a block not including any pupil portion is rather small. Thus, when the block size is set such that each block is small enough to only contain a pupil image portion, the difference in output level between blocks containing pupil portion and those containing no block portion is sufficiently large, so that the position of the pupil can be estimated easily and correctly. On the other hand, if the block size is too small, the number of blocks becomes excessive, with the result that a lot of time is required for processing the signals output from the blocks.

In view of this, it is absolutely necessary for the separation into blocks to be effected in an appropriate block size. However, as is generally known, the pupil of the human eye opens and closes in accordance with the quantity of light incident upon it, which means the size of the pupil varies with the circumstances.

SUMMARY OF THE INVENTION

In one aspect of this invention, there is provided a line-of-sight detecting device of the type which includes receiving means composed of a plurality of photoelectric conversion elements; a plurality of block areas, each including a number of the photoelectric conversion elements are set by block area setting means, each block area outputting a value on the basis of the output of the photoelectric conversion elements constituting that block area; a particular block area that satisfies predetermined conditions based on the values output from the block areas is selected from the plurality of block areas by selection means; and image processing is performed on those photoelectric conversion elements which are in a predetermined range based on the position of the particular block area, selected by the selection means, to thereby detect the line of sight of a viewer, wherein the block area setting means sets the number of photoelectric conversion elements constituting each block area in response to a predetermined situation, thereby making possible a line-of-sight detection method which is quick and highly accurate.

BRIEF DESCRIPTION OF THE DRAWINGS

FIG. 10 is a flowchart showing the subroutine "pupillary edge detection" to be executed by the line-of-sight detecting device of the first embodiment of the present invention;

DETAILED DESCRIPTION OF THE PREFERRED EMBODIMENTS

Figure 1:
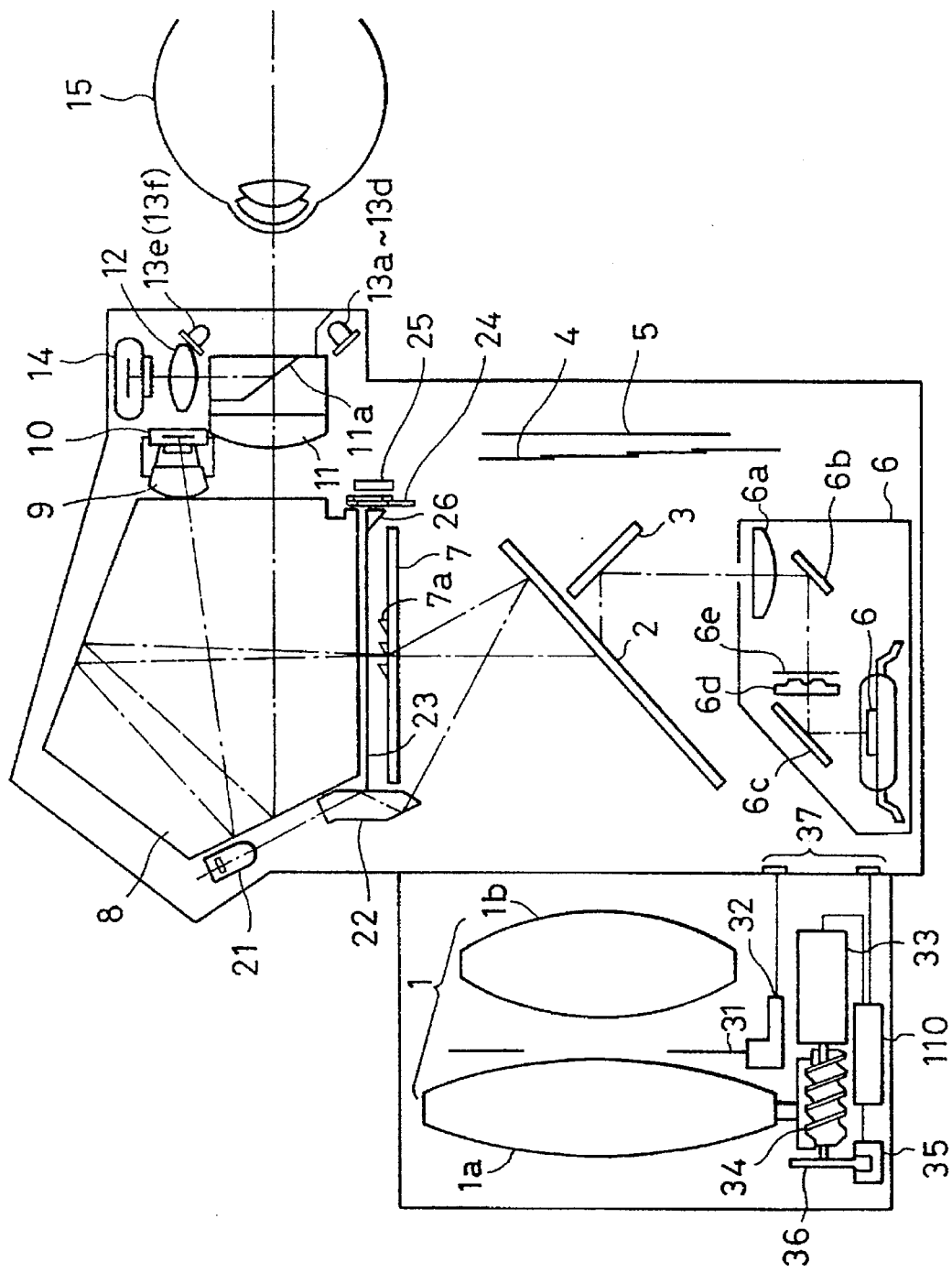
FIG. 1 is a schematic diagram showing the essential part of a single-lens reflex camera equipped with a line-of-sight detecting device according to a first embodiment of the present invention.

The present invention will now be described in detail with reference to embodiments shown in the drawings.

Figure 2:
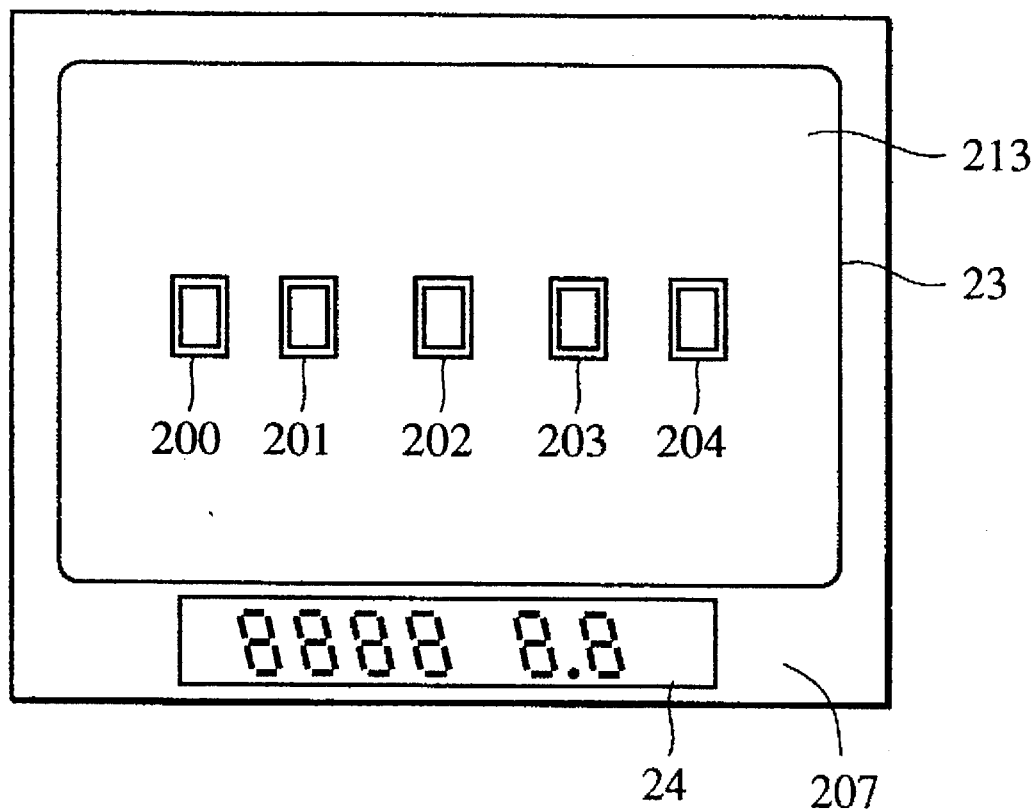
FIG. 2 is a diagram showing the visual field in the finder of the camera shown in FIG. 1.

FIG. 1 is a schematic diagram showing the essential part of a single-lens reflex camera to which a line-of-sight detecting device according to a first embodiment of the present invention is applied; and FIG. 2 is a diagram showing the visual field in the finder of the single-lens reflex camera shown in FIG. 1.

In FIG. 1, numeral 1 indicates a photographic lens system, which is shown, for the sake of convenience, as composed of two lenses 1a and 1b, but is actually composed of a large number of lenses. Numeral 2 indicates a main mirror, which is placed in an oblique position in the photographic optical path in accordance with the viewing state and the photographing state. Numeral 3 indicates a sub-mirror, which reflects downward the luminous flux transmitted through the main mirror 2. Numeral 4 indicates a shutter. Numeral 5 indicates a photosensitive member, which consists, for example, of silver film, a solid-state image sensing device, such as CCD or MOS-type, or an image pick-up tube, such as vidicon.

Numeral 6 indicates a focus detecting device, which is of the well-known, phase-difference type, which is composed of a field lens 6a, reflecting mirrors 6b and 6c, a secondary image formation lens 6d, a diaphragm 6e, a line sensor 6f composed of a plurality of CCDs described below, etc. The focus detecting device 6 shown in the drawing is constructed such that it is capable of performing focus detection on a plurality of areas (five ranging point marks 200–204) in the visual field 213 (viewing screen) of the finder, as shown in FIG. 2.

Numeral 7 indicates a focusing plate, which is placed in a predetermined image forming plane, and numeral 8 indicates a penta prism for changing the finder optical path. Numerals 9 and 10 respectively indicate an image formation lens and a ranging sensor for measuring the luminance of the object. The image formation lens 9 conjugately relates the focusing plate 7 to the ranging sensor 10 through the reflection path in the penta prism 8.

Numeral 11 indicates an eyepiece, which is arranged behind the emission surface of the penta prism 8 and which is used in the observation of the focusing plate 7 by the eye 15 of the photographer. The eyepiece 11 is equipped with a light divider 11a consisting, for example, of a dichroic mirror, which transmits visible light but reflects infrared radiation. Numeral 12 indicates a light-receptive lens, and numeral 14 indicates an image sensor in which photoelectric elements, such as CCDs, are arranged two-dimensionally and so as to be conjugate with the vicinity of the iris of the photographer's eye 15 at a predetermined position with respect to the light-receptive lens 12. The circuit configuration of the image sensor 14 will be described in detail below.

Numeral 13 (13a~13f) indicates IREDs (infrared radiation emitting diodes) serving as the light source for illuminating the eye 15 of the photographer.

Numeral 21 indicates a high-luminance superimposing LED which can be visually recognized even if superimposed over a bright field. Light emitted from the superimposing LED 21 is transmitted by way of a light projecting prism 22, reflected by the main mirror 2, and bent toward the vertical direction by a minute prism array 7a provided on the display section of the focusing plate 7 before it is conveyed via the penta prism 8 and the eyepiece 11 to the eye 15 of the photographer. In view of this, the minute prism array 7a is formed in a frame-like fashion at a position corresponding to the focus detection area on the focusing plate 7, and each prism is respectively illuminated with a corresponding one of the superimposing LEDs 21 (LED-L1, LED-L2, LED-C, LED-R1, and LED-R2), whereby, as can be seen from the visual field of the finder shown in FIG. 2, photometric marks 200, 201, 202, 203 and 204 glow in the finder visual field 213 to display the focus detection areas (Hereinafter, this display will be referred to as "superimposing display").

Numeral 23 indicates a visual-field mask forming the visual-field area of the finder, and numeral 24 indicates an in-finder LCD for displaying photographic information outside the visual field of the finder. The in-finder LCD 24 is illuminated by an illuminating LED (F-LED) 25. The light transmitted through the in-finder LCD 24 is guided to the interior of the finder by a triangular prism 26, and displayed in a region 207 outside the finder of FIG. 2, and the photographer observes the photographic information.

Numeral 31 indicates a diaphragm provided in the photographic lens 1; numeral 32 indicates a diaphragm driving device including a diaphragm driving circuit A111 (FIG. 3A) described below; numeral 33 indicates a lens driving motor; and numeral 34 indicates lens driving member consisting of a driving gear or the like. Numeral 35 indicates a photocoupler, which detects the rotation of a pulse plate 36 linked with the lens driving member 34 and transmits it to a lens focusing circuit A110. The lens focusing circuit A110 drives the lens driving motor 33 by a predetermined amount on the basis of this information and information on the lens driving amount from the camera side, moving a focusing lens 1a of the photographic lenses 1 to a focusing position. Numeral 37 indicates a well-known mount contact serving as an interface between camera and lens.

Figure 3A:
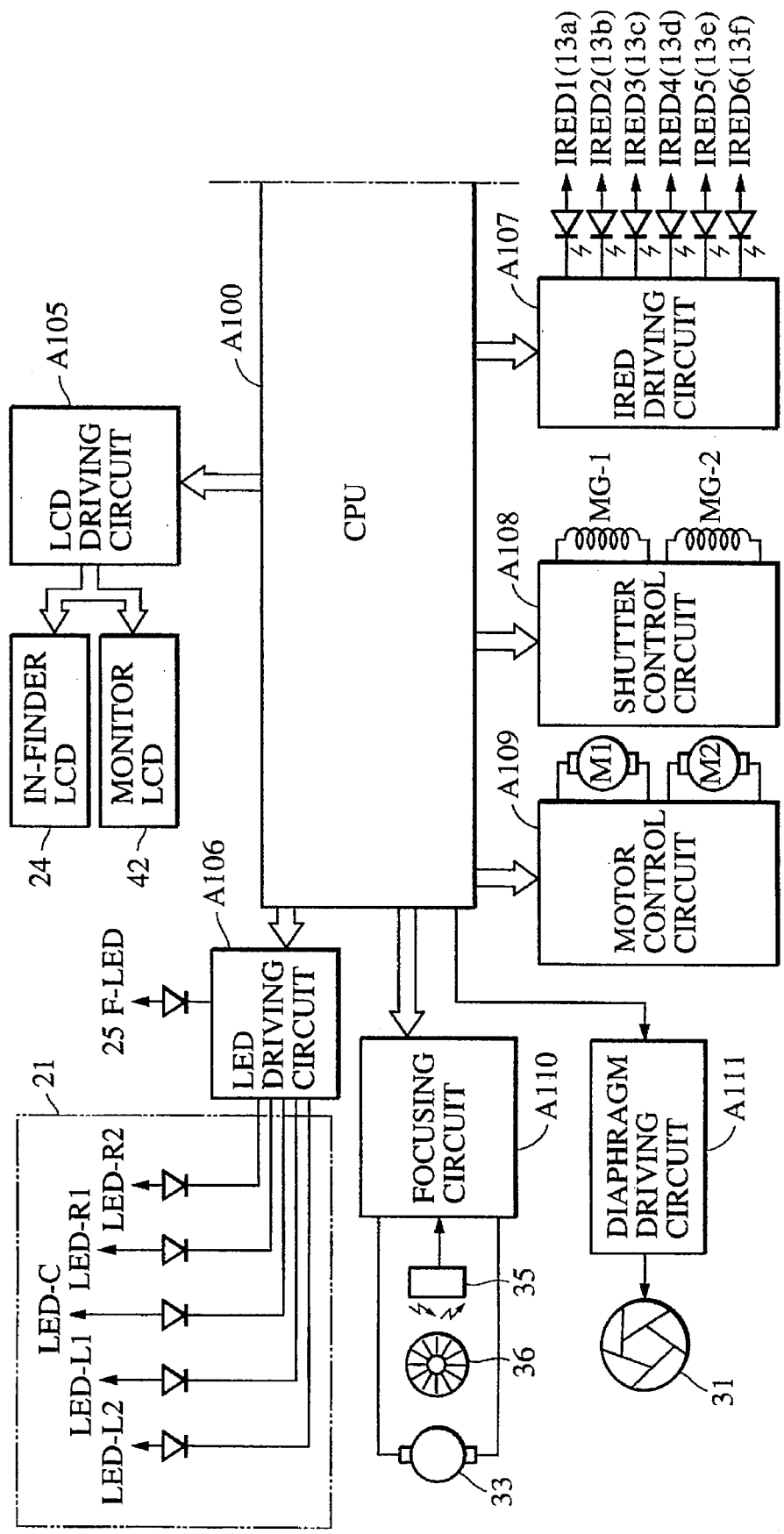
FIG. 3 (consisting of FIGS. 3(A) and 3(B)) is a block diagram showing the electrical construction of the camera of FIG. 1.

FIG. 3, consisting of FIG. 3A and FIG. 3B, is a block diagram showing the electrical construction of a single-lens reflex camera having a construction as described above. The components which are the same as those of FIG. 1 are indicated by the same reference numerals.

In the drawing, connected to a central processing unit (hereinafter referred to as "CPU") A100 of a microcomputer serving as a built-in camera control means provided in the camera body are: a line-of-sight detection circuit A101; a photometry circuit A102, an automatic focus detection circuit A103; a signal input circuit A104, an LCD driving circuit A105, an LED driving circuit A106, an IRED driving circuit A107, a shutter control circuit A108, and a motor control circuit 109. Between the focusing circuit A110, provided in the photographic lens 1, and a diaphragm driving circuit A111, signal transmission is effected through a mount contact 37 shown in FIG. 1.

An EEPROM A100a, serving as storage means assigned to the CPU A100, is capable of storing photographic information regarding a film counter, etc.

The line-of-sight detection circuit A101 A/D-converts an eyeball image output from the image sensor 14 (CCD-EYE), and transmits this image information to the CPU A100. As described below, the CPU A100 extracts feature points of the eyeball image needed for line-of-sight detection in accordance with a predetermined algorithm, and further calculates the angle of rotation of the photographer's eyeball from the positions of the feature points.

In the single-lens reflex camera of this embodiment, the angle of rotation is utilized to calculate and extract the line of sight (point of fixation) of the photographer in the finder, and one of the five ranging points 200 through 204 is selected to perform automatic focus detection at this ranging point.

The above-mentioned photometry circuit A102 amplifies the output from a ranging sensor 10 (FIG. 1), and then effects logarithmic compression and A/D conversion on the output before transmitting it to the CPU A100 as luminance information on the sensors. In the ranging sensor 10, the screen is divided into four sections, which is composed of four photo diodes, SPC-L, SPC-C, SPC-R, and SPC-A, which emit photoelectric conversion outputs.

A line sensor 6f connected to the automatic focus detection circuit A103 is a well-known CCD line sensor, which consists of five sets of line sensors, CCD-L2, CCD-L1, CCD-C, CCD-R1, and CCD-R2. The automatic focus detection circuit A103 A/D-converts the voltage obtained from this line sensor 6f, and transmits it to the CPU A100.

Numeral SW1 indicates a photometry switch which is turned ON with a first stroke of a release button (not shown) to start photometry, automatic focusing, and line-of-sight detecting operation; numeral SW2 is a release switch which is turned ON with a second stroke of the release button; and numerals SW-DIAL1 and SW-DIAL2 indicate dial switches provided in an electronic dial (not shown), which are used when inputting data to an updown counter of the signal input circuit to count the rotation click amount of the electronic dial.

Numerals SW-HV1 and SW-HV2 indicate posture detecting switches which consist of mercury switches or the like and which are adapted to detect whether the camera is in the horizontal or vertical position. The IRED to be used for line-of-sight detection on the basis of this information is selected from the IREDs 13a through 13f.

The signal input circuit A104 serves to transmit switch or dial information for inputting photographic information to the CPU A100. The LCD driving circuit A105 is a well-known circuit for driving the liquid crystal display device for display and is capable of displaying the diaphragm value, shutter speed, set photographic mode, etc., simultaneously on the monitor LCD 42 and the in-finder LCD 24 in accordance with a signal from the CPU A100.

The LED driving circuit A106 controls the lighting up and blinking of an illumination LED (F-LED) 25 and the superimposing LED 21. The IRED driving circuit A107 selectively causes the IREDs 13a through 13f (1~6) to light up in accordance with the situation.

The shutter control circuit A108 controls electromagnets MG-1 and MG-2 which, when energized, respectively cause the leading curtain and the trailing curtain to run, and which causes the photosensitive member to be exposed to a predetermined quantity of light. The motor control circuit A109 controls a motor M1 for advancing and rewinding the film, and a motor M2 for charging the main mirror 2 and the shutter 4. The shutter control circuit A108 and the motor control circuit A109 execute a series of operations of camera release sequences.

An embodiment will now be described in which, prior to the signal processing for the A/D conversion of the output signals of the photoelectric conversion elements to perform line-of-sight detection, the photoelectric conversion output indicating the feature points of the eyeball (Purkinje images or the pupillary section) is specified. After setting the area in the image sensor large enough to actually perform signal processing, the line of sight is detected on the basis of the total output of the photoelectric conversion element in this set area.

First, the circuit of the image sensor 14 and its operation will be described with reference to FIGS. 4 through 6.

In one example, the pupillary section is exclusively detected to perform line-of-sight detection. In the example illustrated here, however, both the Purkinje images and the pupillary section are detected beforehand.

Figure 4A:
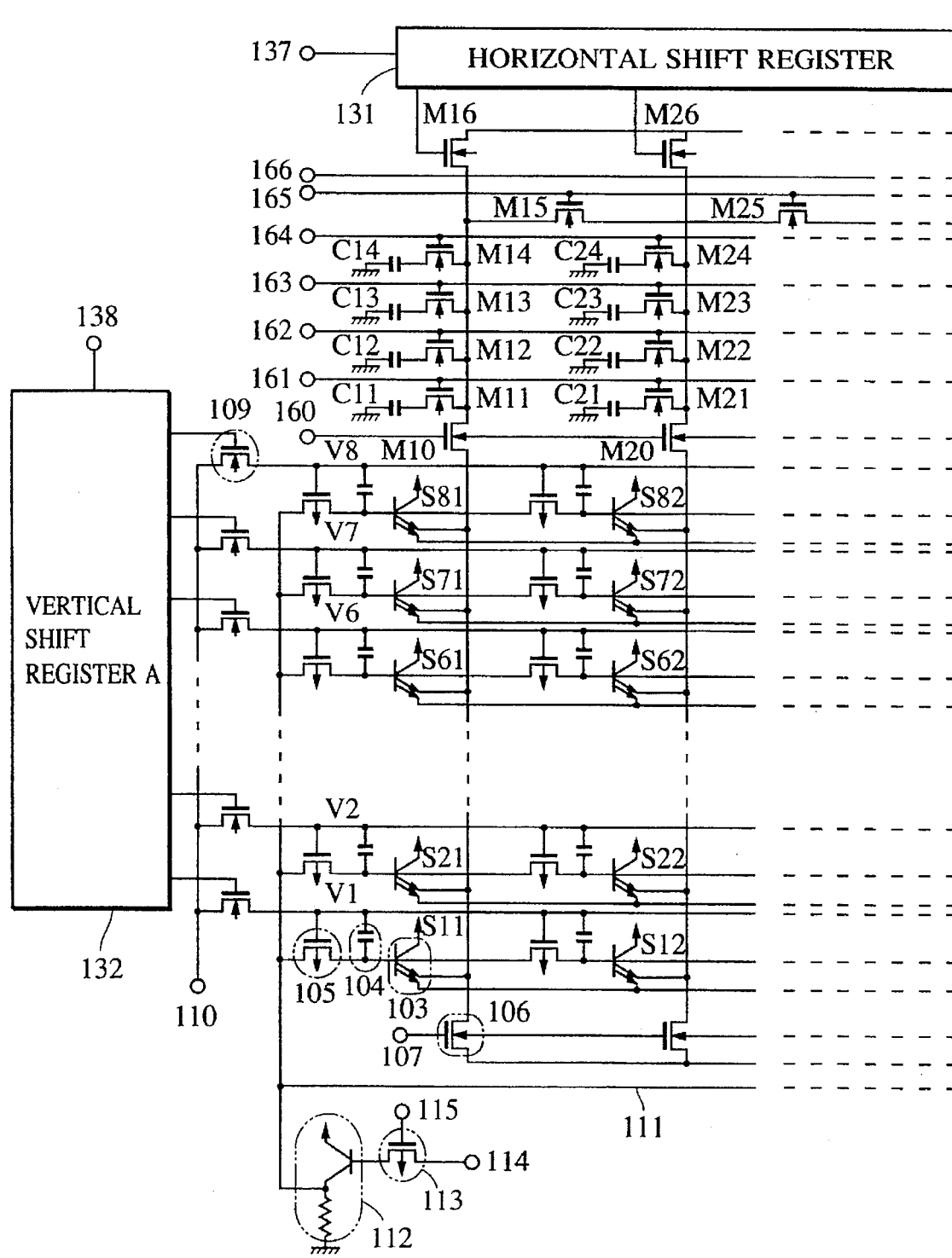
FIG. 4 (consisting of FIGS. 4(A) and 4(B)) is a circuit diagram showing an example of the construction of the image sensor shown in FIG. 1.
Figures 4, 4B:
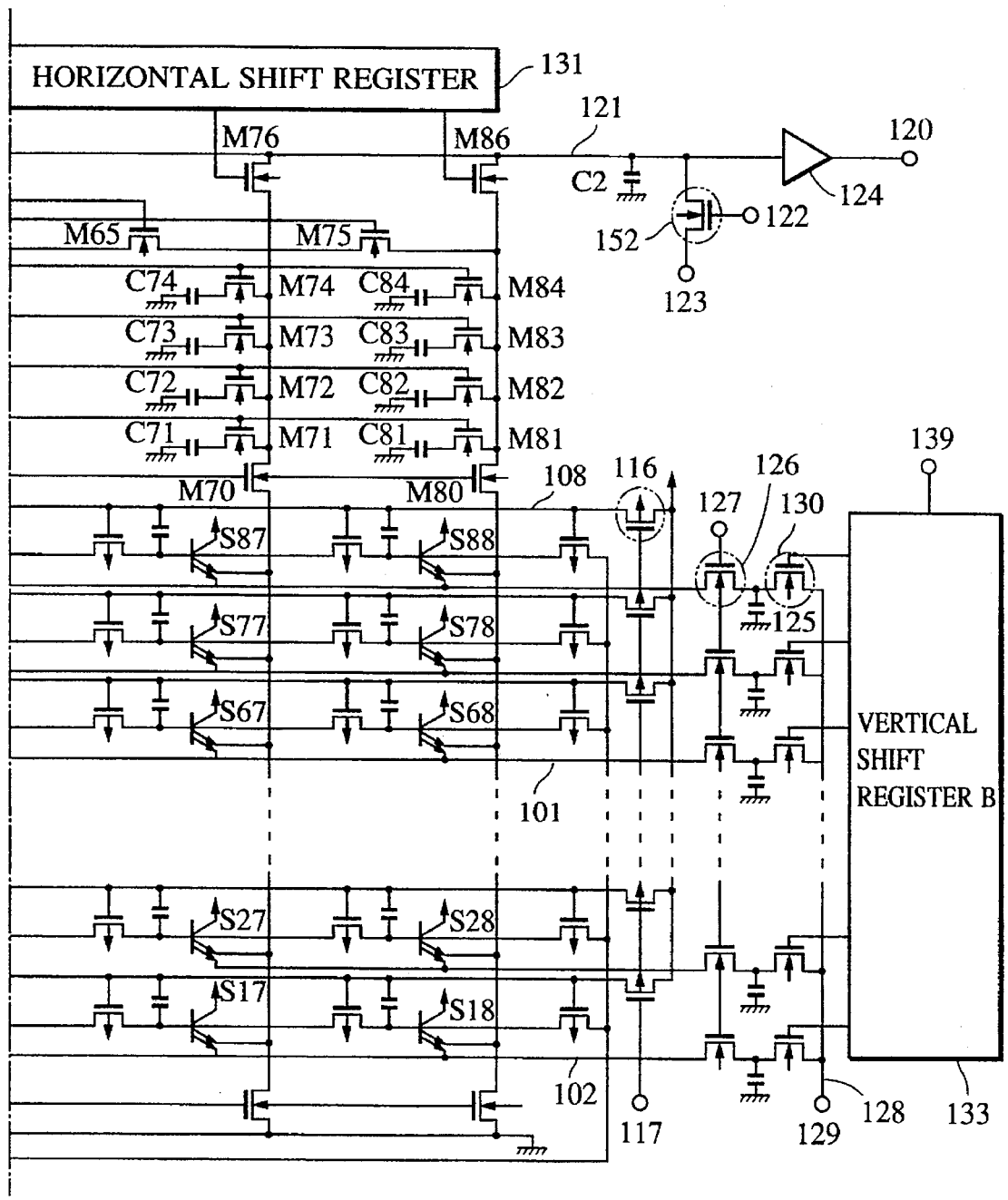
Figure 5:
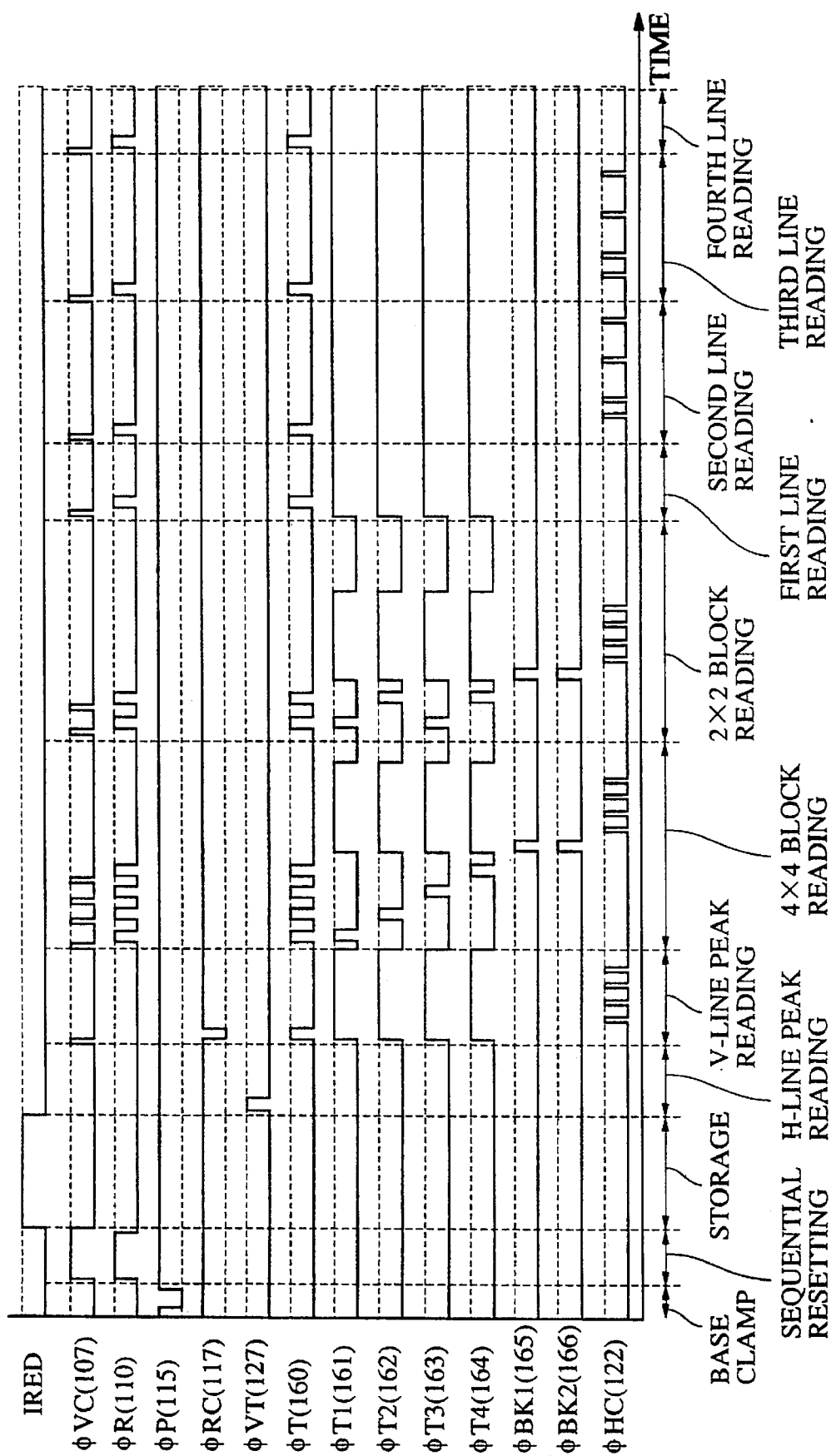
FIG. 5 is a timing chart for supporting the explanation of the operation of the image sensor of FIG. 4.
Figure 6:
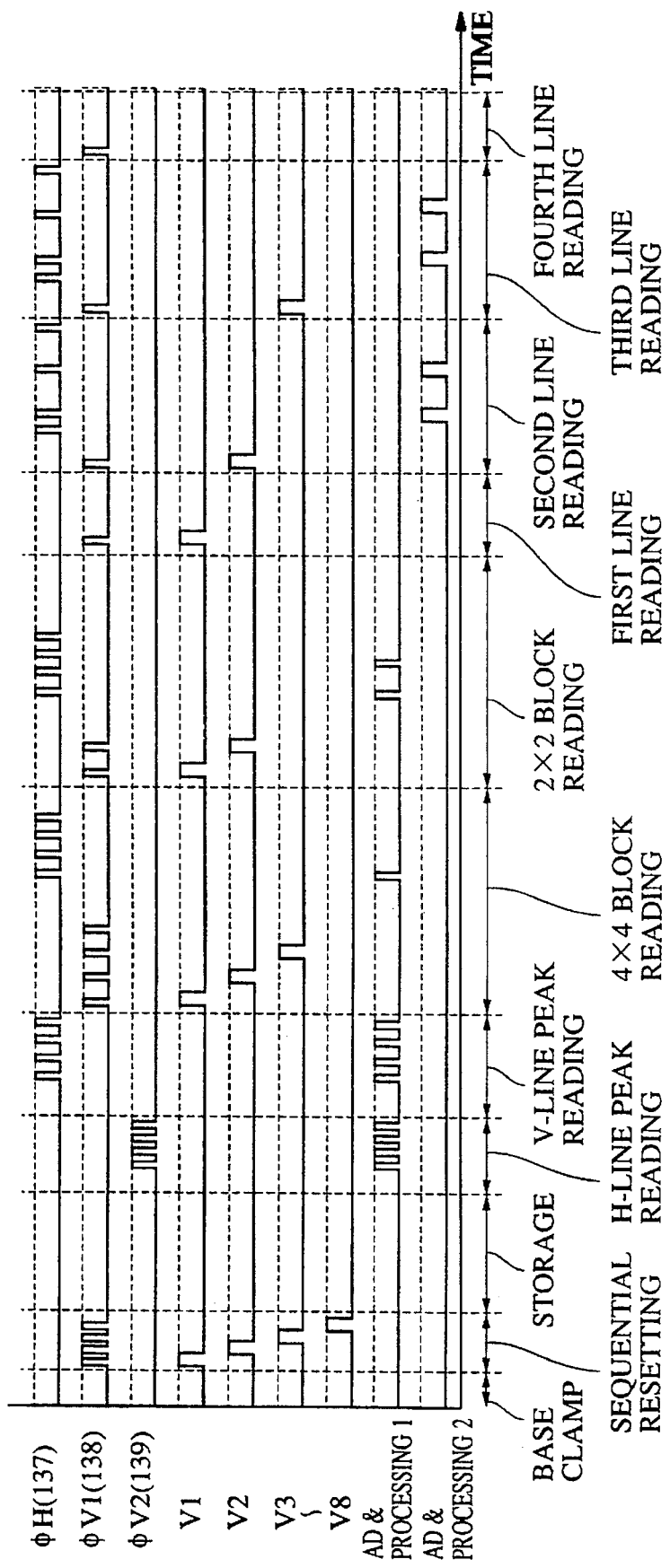
FIG. 6 is another timing chart for supporting the explanation of the operation of the image sensor of FIG. 4.

FIG. 4, consisting of FIG. 4A and FIG. 4B, is a diagram showing the circuit configuration of the image sensor (IMAGE-EYE) 14 shown in FIG. 3B, and FIGS. 5 and 6 are timing charts for supporting the explanation of the operation of the circuit.

The image sensor 14 actually consists of an area sensor having approximately 150 (horizontal)×100 (vertical)= 15000 pixels (in total). In FIG. 4, however, it is depicted as an area sensor having 8×8=64 pixels, for the sake of convenience.

The image sensor 14 is controlled by the CPU A100 through the line-of-sight detecting circuit A101. It has a pixel resetting function, a photoelectric conversion storage function, and a storage signal outputting function. It is further endowed with a function by which it outputs the peak value of each horizontal line and the peak value of each vertical line prior to the output of the pixel signal for actual line-of-sight detection, and a function by which it outputs an average block signal of 6 (horizontal)×6 (vertical)=36 pixels, or an average block signal of 3×3=9 pixels, prior to the pixel signal output.

In FIGS. 4 through 6, however, to facilitate understanding, either an average block signal of 4×4=16 pixels or an average block signal of 2×2=4 pixels is selected and output.

In FIG. 4A, numeral 103 indicates one photoelectric conversion element, which consists of a bipolar transistor having a double emitter for storing photoelectric charge at the base thereof. The first emitter is connected to an output line 101, and the second emitter is connected to an output line 102. Numeral 104 indicates a capacitor for controlling the base potential of the bipolar transistor 103; numeral 105 indicates a P-type MOS (hereinafter abridged as "pMOS") transistor for resetting the above-mentioned base; numeral 106 indicates a MOS transistor for grounding the vertical output line 101; numeral 107 indicates a terminal for applying pulses to the gate of the MOS transistor 106; and numeral 108 indicates a horizontal drive line for controlling the base potential of the bipolar transistor 103 through the capacitor 104 to effect pixel resetting and reading.

Numeral 109 indicates a buffer MOS transistor for pixel line selection which is turned on when the output of the vertical shift register A 132 is applied to the gate; numeral 110 indicates a terminal for applying pixel drive pulses; numeral 111 indicates a signal line connected to the drains of the left-hand and right-hand end pMOS 105; numeral 112 indicates an emitter follower whose output is connected to the signal line 111; numeral 113 indicates a MOS transistor for controlling the base electric potential of the emitter follower 112; numeral 114 indicates a power source terminal connected to the drain terminal of the MOS transistor 113; numeral 115 indicates a terminal for applying pulses to the gate of the MOS transistor 113; numeral 116 indicates a pMOS transistor whose drain is fixed to a positive electric potential; and numeral 117 indicates a terminal for applying pulses to the gate of the pMOS transistor 116.

Numerals C11, C12, . . . , C14, and C84 indicate capacities for accumulating the pixel output electric potential output through the vertical output line 101; numerals M10, M11, M12, . . . , M14, and M84 indicate MOS transistors for the switching of the output line 101 and the capacitors C11, C12, . . . , C14, and C84; numerals 160 through 164 indicate terminals for applying pulses to the gates of M10, M11, M12, . . . , M14, and M84; and numeral 121 indicates a horizontal output line; numeral C2 indicates a parasitic capacity up to that section; and numerals M16, M26, and M86 are switching MOS transistors which conduct the capacities C11, C12, . . . , C14, and C84 with the horizontal output line 121 when selected by the output of the horizontal shift register (131). Numeral 152 indicates a MOS transistor for grounding the horizontal output line 121; numeral 122 indicates a terminal for applying pulses to the gate of the MOS transistor 152; numeral 124 indicates an amplifier which inputs the electric potential of the output line 121; and numeral 120 indicates the output terminal thereof.

Image signals stored in the photoelectric conversion element 103 are transferred to C11 through C84 for each horizontal line, and are outputted pixel by pixel. The peak value for each line and the average block output are also output from the output terminal 120.

Numeral 125 indicates a capacitor for accumulating the pixel output electric potential to be output through the output line 128; numeral 126 indicates a MOS transistor for switching between the output line 128 and the capacitor 125; numeral 127 indicates a terminal for applying pulses to the gate of the MOS transistor 126; numeral 128 indicates an output line to which the electric potential of the capacitor 125 conducts; numeral 129 indicates an output terminal connected to the output line 128; and numeral 130 indicates a switching MOS transistor for sequentially bringing the capacitor 125 and the output line 128 into conduction. The peak value for each horizontal line is output from the output terminal 129.

Numeral 132 indicates a vertical shift register A; numeral 138 indicates a terminal for applying pulses for driving it; numeral 133 indicates a vertical shift register B; numeral 139 indicates a terminal for applying pulses for driving it; numeral 131 indicates a horizontal shift register; numeral 137 indicates a terminal for applying pulses for driving it; numerals M15, M25, . . . , M65, and M75 indicate MOS transistors for directly connecting the capacitors C11, C12, . . . , C14 and C84 block by block; and numerals 165 and 166 are terminals for applying pulses to the gate thereof. Due to this construction, it is possible to average a plurality of photoelectric conversion outputs block by block.

Next, the operation of this sensor will be described with reference to the pulse timing charts shown in FIGS. 5 and 6.

In FIGS. 5 and 6, symbols ØVC, ØR, ØP, ØRC, ØVT, ØT, ØT1, ØT2, ØT3, ØT4, ØBK1, ØBK2, ØHC, ØH, ØV1 and ØV2 indicate sensor driving pulses to be respectively input to the input terminals 107, 110, 115, 117, 127, 160, 161, 162, 163, 164, 165, 166, 122, 137, 138 and 139. Symbols V1, V2, V3~V8 indicate signals for selecting the first, second, third~eighth pixel lines, respectively. "AD & Processing 1" and "AD & Processing 2" mean AD-converting the output signals of 120 and 129 by the line-of-sight detecting circuit 101 and subjecting them to a processing of the CPU 100 described below.

Next, the image sensor 14 will be described sequentially, function-by-function. The operation is not necessarily executed in the order as described above. The operational sequence will be described with reference to the flowchart below.

[Base Clamp]

First, suppose ØP(115) is at the low level, and the output electric potential of the emitter follower 112 is positive. At this time, the electric potential of the drive line 108 connected to the gate of the pMOS transistor 105 is low, and the pMOS transistor 105 is turned ON, with the base electric potential of the bipolar transistor 103 in every pixel being at the same level as the output potential of the emitter follower 112.

[Sequential Resetting]

The ØP(115) is set at the low level, and the output of the emitter follower 112 is set to GND (ground). After this, the ØVC (107) is set at the high level, and the vertical output line 101 is grounded, and an emitter current is passed through the first emitter of the bipolar transistor 103 of each pixel, thereby lowering the base electric potential thereof. Further, the vertical shift register A(132) is started by the driving pulse due to the ØV1, and pulses are added line by line from the ØR (110) to the horizontal drive line 108. The base electric potential of each pixel of the line on which the drive line 108 is at the high level is first raised. However, the base electric potential is lowered by the emitter current of the first emitter flowing again. When the electric potential of the drive line 108 becomes Low, the base electric potential becomes negative, and the first emitter/base interval is brought to the reverse bias state.

[Accumulation]

When this reverse bias state is attained, the IRED light up, and the electric charge generated by the incident light is accumulated in the base of each pixel, with the base electric potential being raised in accordance with the accumulated charge amount.

[H-line Peak Reading]

Next, ØRC (117) is set to Low, and the pMOS transistor 116 is turned on to bring the electric potential of the horizontal drive line to the High level. At this time, the electric potential of each pixel is raised due to the above-described capacitive coupling, and the emitter/base interval is brought to the forwardly biased state. The output value of the maximum output pixel in each line appears in the output line 102, and its output line electric potential is accumulated in each accumulation capacitor 125 through the MOS transistor 127. Next, the vertical shift register B 133 is started by the ØV2 (139), and the electric potential of the capacitor 125 is sequentially output from the output terminal 129. This signal is used by the CPU 100 for the purpose of controlling the accumulation time.

[V-Line Peak Reading]

The ØVC (107) is set to Low, the vertical output line 101 is brought to the floating state, the ØRC (117) is set to Low, the pMOS transistor 116 is turned on, and the electric potential of the horizontal drive line is set to the High level. At this time, the base electric potential of each pixel is raised by the above-described capacitive coupling, and the emitter/base interval is brought to a forwardly biased state. The output value of the maximum output pixel of each column appears in the output line 101, and the output line electric potential is accumulated in the accumulation capacitors C11, C12~C84 through the MOS transistors M10, M11, M12, M84. Next, the horizontal shift register 131 is started by the ØH(137), and the electric potential of the capacitors C11 through C84 is first subjected to capacitor division with C2, and then output from 120 by the amplifier 124. This signal is processed by the CPU A100 and used for the purpose of area limitation (described below), etc.

[4×4 Block Reading]

The electric potential of the vertical output line 101 is grounded by the pulse ØVC (107), and then brought to the floating state. The vertical shift register A 138 is driven by ØV1 (138) and, at the same time, the pulse ØR (110) is applied, with pulses being applied to the first line V1 of the drive line 108. The output electric potential of each pixel (S11~S18) of the first row appears in the output line 101, and the output electric potential is accumulated in the capacities C11~C84 by the pulses of ØT (160) and ØT1 (161).

Next, the output of the vertical shift register A is set to the next row by the ØV1 (138) to repeat the above operation. Then, instead of the pulse ØT1 (161), the pulse ØT2 (162) is used to accumulate the output electric potential of each pixel (S21~S28) of the second row in the capacitors C12~C82.

Similarly, the output of the vertical shift register A 138 is set to the next row by the ØV1 (138) to repeat the above operation. This time, the pulse of ØT3 (163) is used to accumulate the output electric potential of the pixels (S31~S38) of the third row in the capacitors C13~C83.

Next, similarly, the output of the vertical shift register is set to the next row to repeat the above operation four times.

This time, the pulse ØT4 (164) is used to accumulate the output of the pixels (S41~S48) of the fourth row in the capacitors C14~C84.

Next, when the pulses ØBK1 (165) and ØBK2 (166) are applied, the MOS transistors M15, . . . , M55, M65, and M75 are turned on, and the 4×4=16 capacitors, C11, C12, . . . , C44, are averaged. Similarly, the 4×4=16 capacitors, C51, C52, . . . , C84, are averaged, whereby the output signals of the pixels S11, S12, . . . , S44, grouped in blocks, are averaged to the capacitors, C11, C12, . . . , C44.

The output signals of the pixels S11, S12, . . . , S44, grouped in blocks, are averaged to the capacitors, C51, C52, . . . , C84. The averaged block signal is transferred to a sequential horizontal output line 121 by the horizontal shift register 131, driven by ØH (137), and is output from an output terminal 120 through an amplifier 124. Upon receiving the block signal at the electric potential of C11~C14, the CPU A100 executes predetermined processings (A/D conversion and reading). Since the next groups, C21~C24, C31~C34, and C41~C44 are the same as C11~C14, the above-described predetermined processings are not executed therewith. Similarly, although predetermined processings are executed with the block signals C51~C54, no such processings are executed with the signals C61~C64, C71~C74, and C81~C84.

Further, the output of the vertical shift register A 138 is moved to accumulate the pixels of the fifth, sixth, seventh, and eighth rows (S51~S58, S61~S68, S71~S78, and S81~S88) are accumulated in the capacitors C11~C81, C12~C82, C13~C83, and C14~C84, respectively. Then, the output signals of the pixels S51, S52, . . . , S84 are averaged with the capacitors of C11, C12, . . . , C44, and the output signals of the pixels S55, S56, . . . , S88 are averaged with the capacitors of C51, C52, . . . , C85, by ØBK1 (165) and ØBK2 (166). The averaged block signals are output by driving the horizontal shift register to execute processings similar to the above.

[2×2 Block Reading]

As in the "4×4 block reading" described above, the electric potential of the vertical output line 101 is set by the pulse of ØVC (107), and then brought to the floating state to drive the vertical shift register A by ØV1 (138). At the same time, the pulse ØR (110) is applied, and a pulse is applied to the first line V1 of the drive line 108. The output potential of each pixel (S11~S18) appears in the output line 101, and, by the pulses ØT (160), ØT (161), and ØT (163), the output electric potentials are respectively accumulated in the capacitors C11~C81, and C13~C83.

Next, the output of the vertical shift register A is set to the next line by ØV1 (138), and the above operation is repeated. Then, instead of the pulses ØT1 (161) and ØT3 (163), the pulses ØT2 (162) and ØT4 (164) are used to accumulate the output electric potential of the pixels (S21~S28) of the second row in the capacitors C12~C82 and C14~C84.

Here, in the "2×2 block reading", the MOS transistors M15, M35, M55 and M75 are turned on by the application of the pulse ØBK1 (165), and the 2×4=8 capacitors, C12~C24 are averaged. Similarly, the eight capacitors of each of the groups C31, C32~C44, C51, C52~C64, C71, and C72~C74 are averaged, whereby the output signals of the 2×2=4 pixels S11, S12, . . . , S22, grouped into blocks, are averaged to the capacitors of C11, C12,~C 24. The output signals of the pixels S13, S14, . . . , S24, the output signals of the pixels S15, S16, . . . , S26, and the output signals of the pixels S17, S18, . . . , S28, are respectively averaged to the capacitors of C31, C32~C44, C51, C52~C64, C71, and C72~C74.

The averaged block signals are output by driving the horizontal shift register 131, and, as in the above case, the CPU 100 performs, upon receiving the block signals at the electric potential of C11~C14, predetermined processings (A/D conversion and reading). Since the next group C21~C24 is the same as C11~C14, the above-mentioned predetermined processings are not executed. Upon receiving the block signals of C31~C34, the CPU performs predetermined processings, but does not perform such predetermined processings with respect to the signals of C41~C44.

Further, the output of the vertical shift register A 138 is moved to perform processing on the third row onward by the above operation, and the block output of each "2×2" pixel group are read to execute predetermined processings.

[Regular Reading (First~Eighth Line Reading)]

The regular reading for detecting line of sight will now be described. The same AD conversion and processing are not performed on all the pixels, but the area is restricted by the above peak reading and block reading processings, the AD conversion and processing being executed on the restricted area only. In the description of this embodiment, it will be assumed that the area is restricted to the second and third columns of the second and third rows.

First, as to the first row, it is outside the limitation area, so that, although the vertical shift register A138 is operated, no signal output is effected. Regarding the second row, pixel signals are accumulated in the capacitors C11, C12, . . . , C84, in the same manner as in the block reading, to output signals from the output terminal 120 by the horizontal shift register 131. The CPU 100 performs A/D (analog-to-digital) conversion and a predetermined processing with respect to the signals of the second column (S22) and the third column (S23), and executes no processing with respect to the first column (S21) and the fourth column (S24). With respect to the third row, the same processing as executed on the second row is preformed. As to the fourth to eighth rows, it is the same as in the case of the first row.

In this way, the signal processing with respect to the image sensor 14 (IMAGE-EYE) of this embodiment can be executed prior to the regular reading. It is possible to perform [H-Line Peak Reading], [V-Line Peak reading], and [Block Reading]. The positions of the Purkinje images and the pupillary circle and the levels thereof are approximately obtained beforehand, and, of all the pixels, only the pixel signals of the limitation area are subjected to AD conversion and processing.

Next, the operation of detecting the point of fixation will be described with reference to the flowchart of FIG. 7.

When the variable CPU A100 starts the line-of-sight detecting operation, the initialization of data in step (#001) is executed after step (#000).

Variable EDGCNT is a variable for counting the number of boundary points between the iris and pupil extracted as edges.

Variables IP1, IP2, JP1, and JP2 are variables for representing the Purkinje images of the IREDs 13a and 13b. Two Purkinje images exist in the area of the eyeball reflection image surrounded in the range: IP1~IP2 in the horizontal direction (X-axis) and JP1~JP2 in the vertical direction (Y-axis).

Here, the number of pixels (pixel size) of the image sensor (area sensor) 14 is assumed to be 150 pixels in the horizontal direction and 100 pixels in the vertical direction, and variables IP1, IP2, JP1, and JP2 are stored with the middle position (75, 50) being regarded as the initial value.

After the initialization of data, the procedure advances to step (#002).

In step (#002), IREDs in an appropriate combination are selected from the IREDs 13a~13f for illuminating the eye of the photographer and causing it to light up. The selection of IREDs is made in terms of whether the camera is in the horizontal or vertical position, or whether the photographer is wearing glasses, by using posture switches SW-HV1 and SW-HV2. Then, "base clamping" and "sequential resetting" are effected on the image sensor 14, and accumulation in the image sensor 14 begins.

In step (#003), H-Line (horizontal line) peak reading is executed during accumulation. In step (#004), it is checked as to whether the maximum value of the horizontal line peak has reached a predetermined level or not. If not, the steps (#003) and (#004) are repeated, the interval being looped until the predetermined value is attained. In this way, the accumulation time is controlled, making it always possible to read out appropriate pixel signals.

When the predetermined charge accumulation has been completed, the IREDs are extinguished in the next step (#005).

Subsequently, the limitation area setting subroutine of step (#006) is called.

The contents of this subroutine, which constitute the important feature of the present invention, will be described in detail below. In the subroutine of step (#006), the area of coordinates "IL1~IL2" in the X-axis direction (horizontal direction), and the area of coordinates JL1~JL2 in the Y-axis direction (vertical direction), are determined from the 150 (horizontal)×100 (vertical) pixels.

From step (#007) onward, the regular reading of the area sensor and sequential processing are started.

In step (#007), a so-called "loop processing" in which in-frame processing is executed while counting the loop variable J from 0 up to 99, is executed.

In step (#008), when there is no Y-coordinate in the interval JL1~JL2, the vertical shift register A is solely advanced one step and J is counted up to advance to the next row, as in the case of the first and fourth rows, described with reference to FIGS. 4 through 6.

When there is a Y-coordinate between JL1 and JL2, the procedure advances to step (#009), where the reading of one line of photoelectric conversion signals in the horizontal direction (X-axis) of the area sensor is executed. The one-line reading is executed in accordance with a subroutine. This subroutine, "one-line reading", is shown in FIG. 8.

Figure 8:
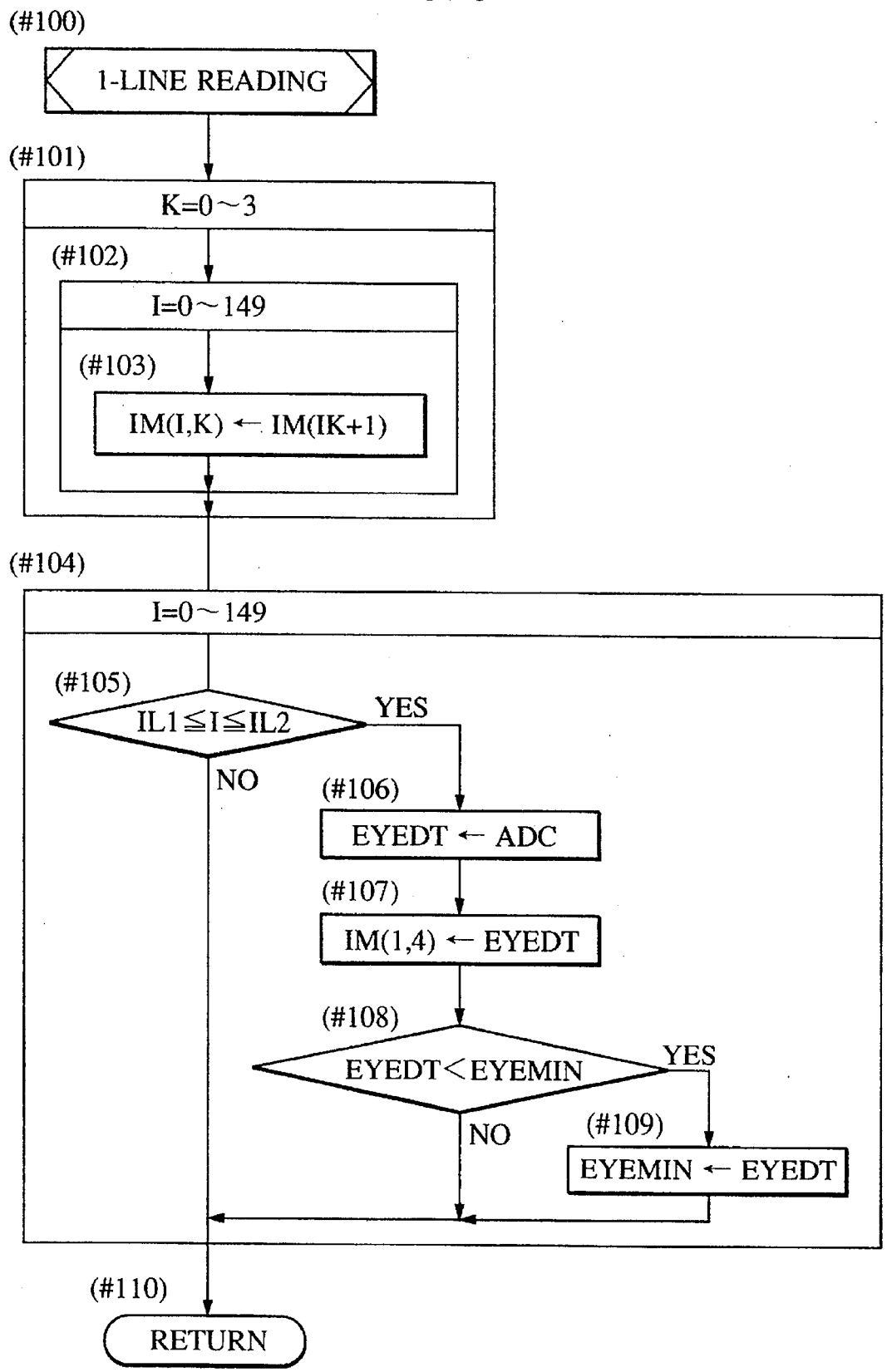
FIG. 8 is a flowchart showing the subroutine "1-line reading" to be performed with the line-of-sight detecting device of the first embodiment of the present invention.

In FIG. 8, when this subroutine, "one-line reading", is called, the procedure advances by way of step (#100) to the operation of (#101). In step (#101), and the in-frame step thereof (#102), the same loop processing as in the above-described step (#006) is executed. In step (#101), variable K is counted from 0 to 3, and in step (#102), variable I is counted from 0 to 149, and with these countings, the in-frame processings are executed. Thus, in step (#101) and step (#102), a "nested" loop processing is executed with respect to the variables K and I.

In step (#103) in the loop processing of step (#102), re-storage of arrangement parameter IM (I, K) is executed.

In this embodiment, the CPU A100 executes signal processing. Generally speaking, however, the storage capacity of the built-in RAM (random access memory) of a microcomputer is not sufficient to be capable of storing all the pixel information of an area sensor. In view of this, in this embodiment, image signals output from the area sensor are sequentially read, and, while doing so, exclusively the latest image signals corresponding to five lines in the horizontal direction (X-axis) are stored in the built-in RAM of the microcomputer to execute the processing for line-of-sight detection for each one-line reading.

The operations executed in the double loop processing of step (#101) to step (#103) are operations of updating the stored five-line image signal data in order to read image signals of a new line. That is, of the arrangement variables IM (I, K), the variable IM (I, 0) [I=0~149] represents the oldest, and the variable IM (I, 4) [I=0~149] represents the latest, one-line image data. Data is prepared in the following manner so that image signals of a new one line can be stored in the form of the variable IM (I, 4) [I=0~149].

IM (I, 0)←IM (I, 1)
IM (I, 1)←IM (I, 2)
IM (I, 2)←IM (I, 3)
IM (I, 3)←IM (I, 4) [I=0~149]

When the loop processing for data updating in step (#101)~step (#103) has been completed, the loop processing of the next step (#104) is executed.

In the loop processing of step (#104), image signals of one line (150 pixels) in the horizontal (X-axis) direction are output, and, while doing so, storage in RAM is effected while executing A/D conversion exclusively in the limitation area. Further, the minimum value of the image signals is detected.

In step (#105), when there is no I value (X-coordinate) between IL1 and IL2, no A/D conversion or processing is executed as in the case of the first and fourth columns of the second row in FIGS. 4 through 6, and the procedure advances to the next column, with the code and variable I being stepped up.

When the value of the variable is between IL1 and IL2, the procedure advances to step (#106), and the CPU A100 stores the value obtained through the A/D conversion of the image signal temporarily in EYEDT.

Then, in the next step (#107), the value of EYEDT is stored in the arrangement variable IM (I, 4). The variable I is counted up from 0 to 149 in the outside loop processing step (#104).

In step (#108), the maximum value of the image signals is detected. Variable EYEMIN is a variable for maintaining the minimum value of the image signals. When, in step (#108), EYEDT is smaller than EYEMIN, the procedure branches off to step (#109), and EYEMIN is updated with this smaller value of EYEDT.

When the loop processing of steps (#104)~(#109) has been terminated, and the storage of image signals of a new one line and the detection of the minimum value have been completed, the procedure returns at the next step (#110) to the subroutine "one-line reading".

Figure 7:
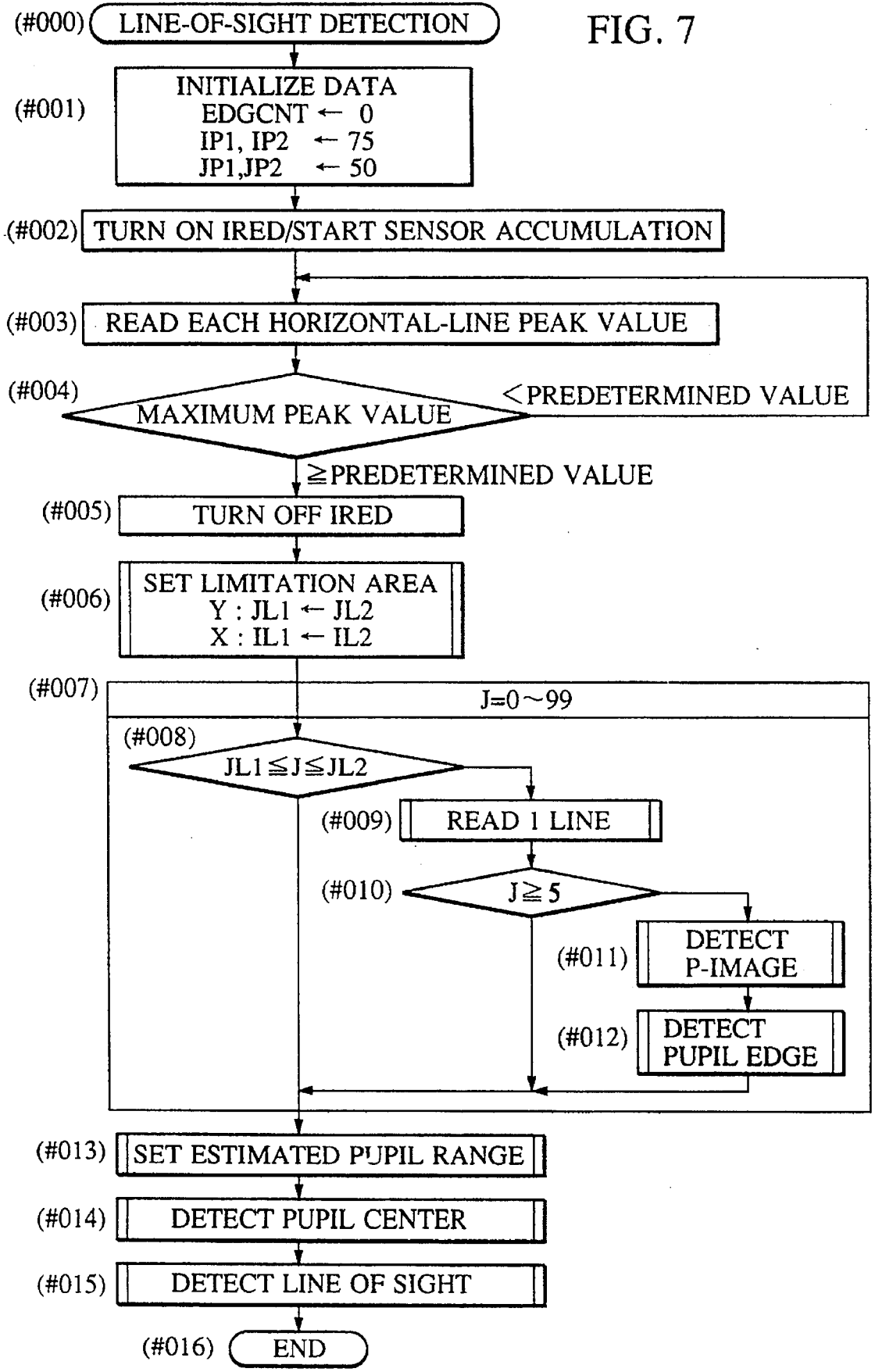
FIG. 7 is a flowchart showing the operation of line-of-sight detection by the line-of-sight detecting device according of the first embodiment of the present invention.

Referring again to the flowchart of FIG. 7, when the subroutine "one-line reading" of step (#009) has been completed, the procedure advances to the next step (#010), where it is checked whether the loop variable J in the outer loop processing step (#007) is not less than 5.

The loop variable J represents the pixel line in the vertical (Y-axis) direction of the area sensor. In this embodiment, the number of pixels is 150×100, so that J is counted up from 0 to 99.

When, in step (#010), the loop variable J is 5 or more, the procedure branches off to step (#011). This is due to the fact that, when the line number of the image signal read is 5 or more, it is possible to execute processing in the vertical (Y-axis) direction of the area sensor.

In step (#011), to which the procedure branches off, the subroutine "Purkinje image detection" is executed.

Figure 9:
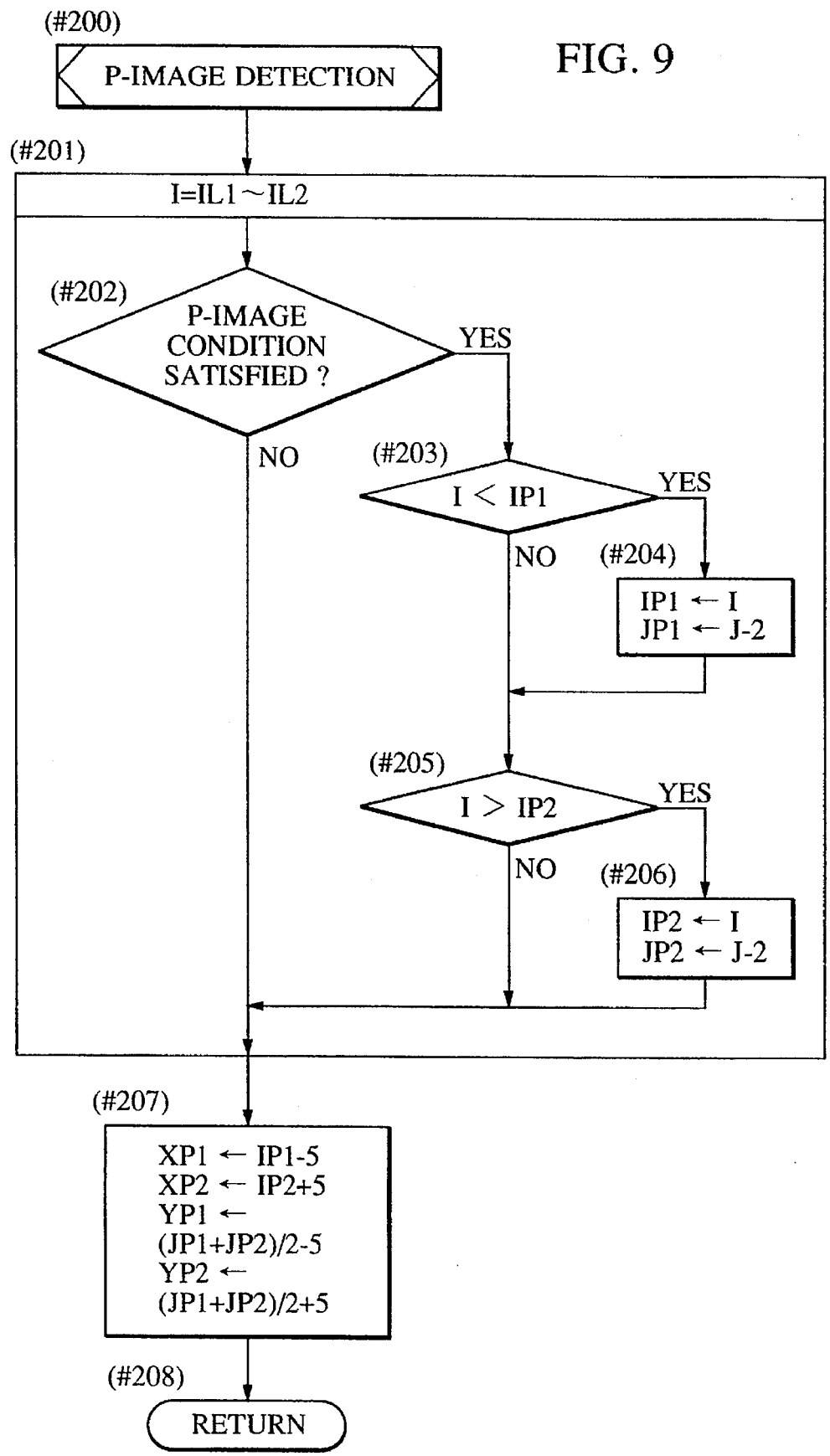
FIG. 9 is a flowchart showing the subroutine "Purkinje image detection" to be executed by the line-of-sight detecting device of the first embodiment of the present invention.

The subroutine "Purkinje image detection" is a process for detecting the positions of the above-described Purkinje images. The processing is executed for each 1-line reading in the horizontal (X-axis) direction of the area sensor. FIG. 9 shows a flowchart illustrating the processing.

In FIG. 9, when the subroutine "Purkinje image detection" is called, the procedure advances by way of step (#200) to step (#201), where loop processing is executed.

The loop processing is executed within the limitation area IL1~IL2. In the loop processing, the positions of the Purkinje images are searched through the image data stored in the form of an arrangement variable IM (I, K). The positions on the area sensor of any Purkinje images detected are stored. In this embodiment, two Purkinje images are generated, so two items of positional information are stored.

In the first step (#202) in the loop, a judgment is made as to whether image data at a predetermined position satisfies the conditions for the Purkinje image or not. The conditions are as follows:

"Purkinje image conditions" in step (#202)

IM (I, 2)>C1 and IM (I, 1)>C2 and IM (I, 3)>C2 and IM (I−1, 2)>C2 and IM (I+1, 2)>C2 where C1 and C2 are threshold constants which are in the relationship: $C1 \geq C2$. C1=EYEMAX−20, and C2=EYEMAX−50. The value, obtained through AD conversion, 8 bit, is assumed to range from 0 to 255. EYEMAX=250.

Figure 20:
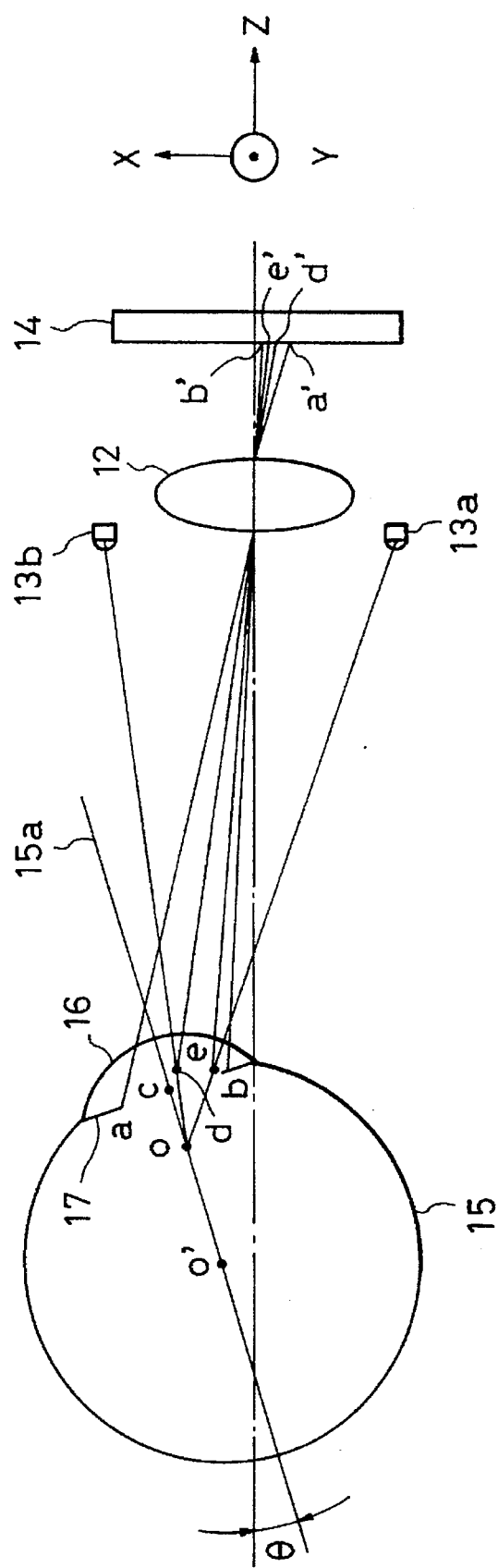
FIG. 20 is a diagram for illustrating the line-of-sight detecting principle of an ordinary line-of-sight detecting device.

In the above conditions, attention is focused on the fact that, as described with reference to FIG. 20, the Purkinje images are something like spot images, and definition is made with respect to both the horizontal and vertical (X and Y-axis) directions. When these conditions are satisfied, a P-image is considered to exist at position (I, 2).

As stated above, the arrangement variable IM (I, K) is updated for each one-line reading in the horizontal (X-axis) direction of the area sensor, and the vertical (Y-axis) position J line is stored in IM (I, 4) [I=0~149]. Therefore, on the area sensor, the address (I, 2) corresponding to the variable IM is the position (I, J−2).

In step (#202), when there is any image data satisfying the Purkinje image conditions, the procedure branches off to step (#203). When there is none, the outer loop variable I is counted up.

From step (#203) onward, the operation of determining the range of existence of the two Purkinje images (the range in the X-axis direction [IP1~IP2], the range in the Y-axis direction [JP1~JP2]) is executed.

First, in step (#203), variables I and IP1 indicative of positions in the horizontal (X-axis) direction of the area sensor are compared with each other. When I<IP1, the procedure branches off to step (#204). That is, when, in the range of existence of Purkinje image, the position of variable I is positioned to the left of the left-hand Purkinje image position IP1 in the horizontal direction, IP1 is rewritten.

In step (#204), the value of variable I is stored in the variable IP1, and the position in the vertical direction at that time, (J−2), is stored in the parameter JP1.

In steps (#205) and (#206), a judgment is made as to the updating of the Purkinje image position IP2, the one existing to the right in the horizontal direction, and JP2 indicating the position in the vertical direction thereof.

When the one-line processing in which the position I in the horizontal (X-axis) direction is in the range of 0 to 149, has been completed through the loop processing of step (#201), the procedure advances to the next step (#207).

In step (#207), variables XP1, XP2, YP1 and YP2 referred to in connection with image processing are computed according to the equations shown in the drawings.

Briefly, these variables are used for the purpose of excluding pupillary edge information for generation in the vicinity of the Purkinje images when detecting the pupil center.

When the processing of step (#207) has been completed, the procedure returns, in the next step (#208), to the subroutine "Purkinje image detection".

Referring back again to the flowchart of FIG. 7, when the subroutine "Purkinje image detection" of Step (#011) is completed, subroutine "pupil edge detection" is executed in the next Step (#012).

In the subroutine "pupil edge detection", the position of a pupil edge (boundary between iris and pupil) is detected, and the steps thereof are illustrated in the flowchart of FIG. 10.

Referring to FIG. 10, when the subroutine "pupil edge detection" is called, the process proceeds from Step (#300) to the next step (#301) in which loop processing is executed. The Step (#301) is a loop processing step like Step (#201) of FIG. 9, in which variable I, which indicates the position of the horizontal dimension (X axis) of the area sensor, is defined as a loop variable.

In addition, as in the "Purkinje image detection" subroutine, the loop processing is performed only within limitation areas IL1~IL2 alone.

In the loop processing of Step (#301), a determination is made as to whether or not there is a pupil edge characteristic in the image data. If there is such a characteristic, the position information thereof is stored. The pupil edge position information is stored in the data form of an arrayed variable EDGDT (m, n).

The arrayed variable EDGDT (m, n) data format is set as follows:

EDGDT (m, 1) . . . mth edge point luminance

EDGDT (m, 2) . . . mth edge point X-axis coordinate

EDGDT (m, 3) . . . mth edge point Y-axis coordinate m indicates the order in which edge points are found in the pupil edge detection sequential processing process. Therefore, when an M number of edges is detected, it is necessary to have an arrayed variable EDGDT capacity of "M×3" bytes. In the flowchart, the number of edges detected is counted by variable EDGCNT.

In the first Step (#302) in the loop processing, a determination is made as to whether there is a previously detected edge point near the image data IM (I, 2).

More specifically, outer loop processing loop variable I indicates the position of the area sensor along the horizontal dimension (X axis), while the address (I, 2) with respect to the arrayed variable IM (I, K) in the form by which image data is stored is the point (pixel coordinates) which is under examination as possibly indicating a pupil edge. An examination is made as to whether each point adjacent to the point (I, 2) has been determined as indicating a pupil edge in the previous sequential processing process, based on the arrayed variable EDGDT (m, n) in the form in which the edge position information is stored.

The determination conditions in Step (#302) are described in detail below.

"Determination conditions" in Step (#302)

{EDGDT (m, 2), EDGDT (m, 3)}={(I−1), (J−2)} or {(I−1), (J−3)} or {(I), (J−3)} or {(I+1), (J−3)}. Here, m=0~(EDGCNT−1).

The coordinates which are currently being examined are coordinates {(I), (J−2)}, so that the aforementioned coordinates indicate the positions adjacent to the current coordinates, at the adjacent left part, adjacent upper left part, the adjacent upper part, or the adjacent upper right part.

Since EDGDT (m, 2) and EDGDT (m, 3) indicate, respectively, the X-axis coordinate and Y-axis coordinate of the mth edge point, this means that the aforementioned conditions determine whether an edge point exists in the positions adjacent to the current coordinates at the adjacent left part, the adjacent upper left part, the adjacent upper part, or the adjacent upper right part.

In Step (#302), if it is determined that an edge point exists near the coordinates (I, J–2), then the process proceeds to Step (#304), and if it does not exist, the process proceeds to Step (#303). In these steps an edge point determination is made in accordance with their respective conditions.

A description will first be given of the steps which are executed when an edge point does not exist near the coordinates.

In Step (#303), a determination is made as to whether the image data of coordinates (I, J–2), which is currently being examined, satisfies the pupil edge condition [the determination conditions in Step (#303) hereinafter referred to as "edge condition 1"]. It is to be noted that coordinates (I, J–2) image data are stored in the data form of arrayed variable IM (I, 2).

"Edge condition 1" in Step (#303)

1) {IM (I–1, 2)–IM (I, 2)}>C3 and {IM (I–2, 2) –IM (I–1, 2)}<C3 and IM (I, 2)<a
2) {IM (I+1, 2)–IM (I, 2)}>C3 and {IM (I+2, 2) –IM (I+1, 2)} C3 and IM (I, 2)<a
3) {IM (I, 1)–IM (I, 2)}>C3 and {IM (I, 0)–IM (I, 1)} C3 and IM (I, 2)<a
4) {IM (I, 3)–IM (I, 2)} C3 and {IM (I, 4)–IM (I, 3)} C3 and IM (I, 2)<a If the image coordinate data satisfies the aforementioned conditions 1) through 4), the coordinates (I, J–2) are determined as being those of an edge point. It is to be noted that in "a=EYEMIN+C4", EYEMIN represents the minimum luminance of the image data up to the current sequential processing.

C4 is a constant determined by EYEMAX and EYEMIN and is expressed as $$C4=(EYEMAX-EYEMIN) \times C5$$

This constant is necessary to determine the pupil edge condition with high reliability, and is convenient for use in cases when there is a large amount of external light and the signal dynamic range (EYEMAX–EYEMIN) is small, as well as, when the dynamic range is large.

C3 and C5 are, for example, "C3=3" and "C5=1/10", respectively.

The aforementioned conditions are such that at the pupil edge (boundary between iris and pupil) the predetermined luminance changes successively and such that the pupil has the lowest luminance in the eyeball reflection image. The aforementioned conditions 1) and 2) allow extraction of the edge in the horizontal dimension (X axis) of the area sensor, while conditions 3) and 4) allow extraction of the edge in the vertical dimension (Y axis).

When the coordinates (I, J–2) are extracted as a pupil edge point, the process branches off from Step (#303) to Step (#305), so as to allow storage of the edge point luminance value and coordinates.

In Step (#305), information is stored in the data form of arrayed variable EDGDT (m, K) for storing edge position information as follows.

EDGDT (EDGCNT, 1)←IM (I, 2)
EDGDT (EDGCNT, 2)←I
EDGDT (EDGCNT, 3)←J–2 where IM (I, 2) represents the luminance of the EDGCNTth detected edge, while I represents the X coordinate and (J–2) represents the Y coordinate.

Then, the variable EDGCNT is counted up by one, which is used for counting the number of detected edge points.

When the processing of Step (#305) is completed, an outer loop processing loop variable I (denotes horizontal dimension, X-axis coordinate) is counted up to re-execute Step (#302) and onwards in the flowchart.

A description will be made of the steps, which are executed when it is determined that an edge point exists near the current coordinates (I, J–2) in Step (#302).

In this case, the process proceeds to Step (#304), in which, as in Step (#303), a determination is made as to whether the coordinate (I, J–2) image data being currently examined satisfies the pupil edge conditions [determination conditions in Step (#304) hereinafter referred to as "edge conditions 2"].

Here, the "edge conditions 2" are less severe than "edge conditions 1". In the embodiment, the condition formulas are the same, and the threshold values C3, C4, and C5 are denoted as C3', C4', and C5' respectively, and are defined as follows.

C3'=2
C4'=(EYEMAX–EYEMIN)×C5'
C5'=0.15

With the threshold values set as mentioned above, there is a higher probability that a point will be determined as an edge than under "edge conditions 1".

Two types of edge conditions are provided because the edge points do not exist separately but continuously, so that if a point is an edge point, this determination is based on the viewpoint that there is a high probability that a similar edge point exists near this edge point.

If a point is determined as an edge point under "edge conditions 2" of Step (#304), the process branches off to Step (#305) to store information of the coordinates thereof.

As described above, the loop processing of Step (#301) is executed until the loop variable I becomes IL2. When an edge detection for one line in the horizontal dimension of the area sensor is completed, the process proceeds to Step (#306) and the returning step in the subroutine "pupil edge detection" is executed.

Referring back to FIG. 7, when the subroutine "pupil edge detection" of Step (#012) is completed, the outer loop processing step (#007) loop variable J (represents area sensor vertical dimension, Y-axis coordinate) is counted up, and until J becomes 99, Step (#008) and onwards are re-executed.

When the loop variable J becomes 99 and the reading and processing of all the pixels of the area sensor are completed, the process proceeds from Step (#007) to Step (#013).

Based on Purkinje image position and pupil edge information detected in the loop processing of Step (#007), in Steps (#013) to (#015), pupil center coordinate detecting and line-of-sight detecting are carried out.

First, in Step (#013), subroutine "set estimated pupil range" is called.

The plurality of pupil edge points detected in subroutine "detect pupil edge" of Step (#012) includes not only edge points indicating the actual pupillary circle (circle formed by the boundary of the iris and pupil), but also false edge points produced by various noises.

The subroutine "set estimated pupil range" is provided to remove false edge points mentioned above, achieved by limiting the coordinate ranges to those of the most probably actual edge points. The flowchart of the subroutine is illustrated in FIG. 11.

Figure 11:
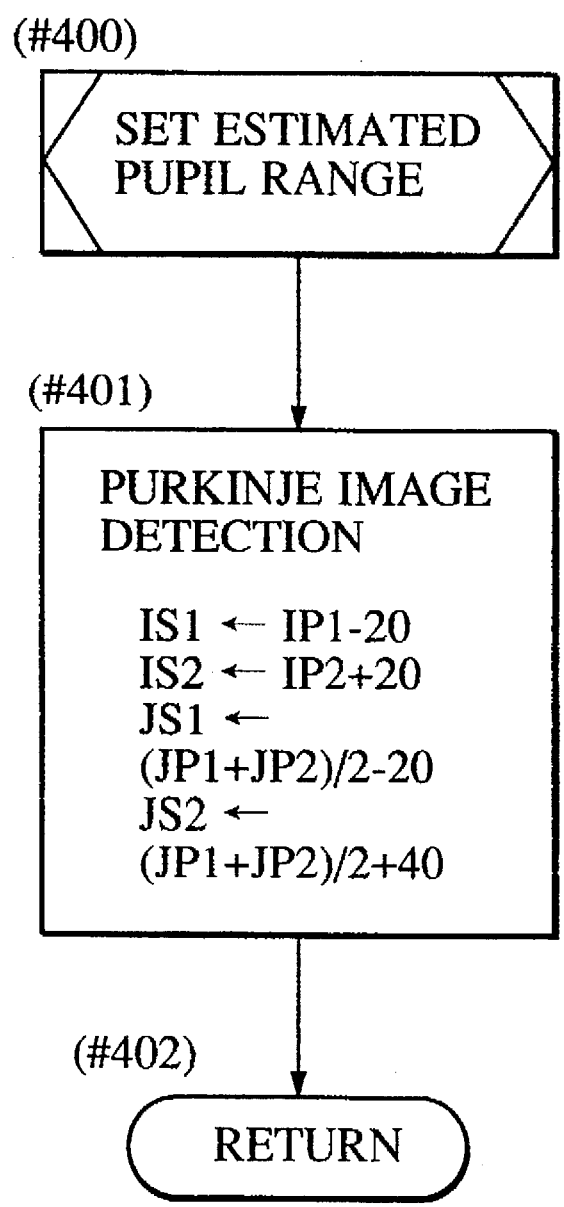
FIG. 11 is a flowchart showing the subroutine "setting of estimated pupil range" to be executed by the line-of-sight detecting device of the first embodiment of the present invention.

Referring to FIG. 11, when the subroutine "set estimated pupil range" is called, Step (#400) and then Step (#401) are executed.

Figure 21A:
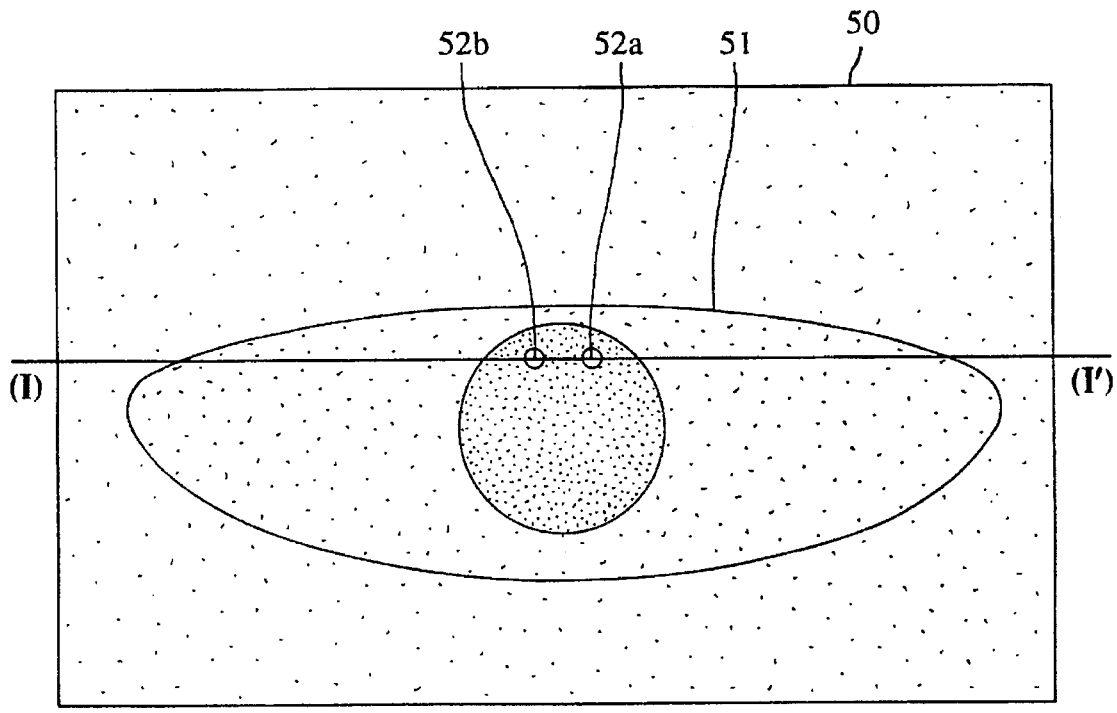
FIG. 21 is a diagram showing an eye image projected onto the image sensor shown in FIG. 20 and an output thereof.
Figure 21B:
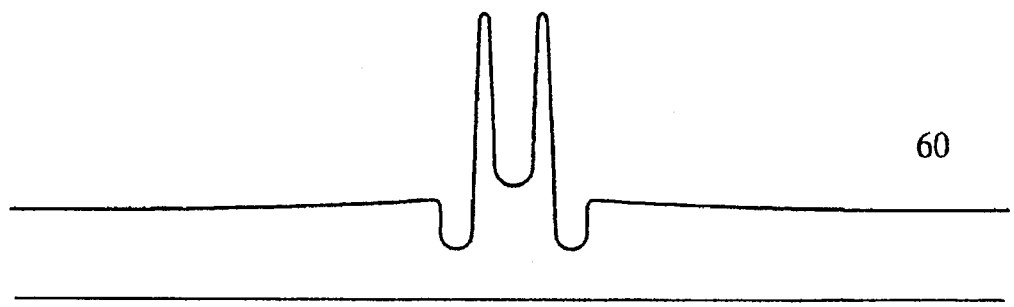
Figure 22A:
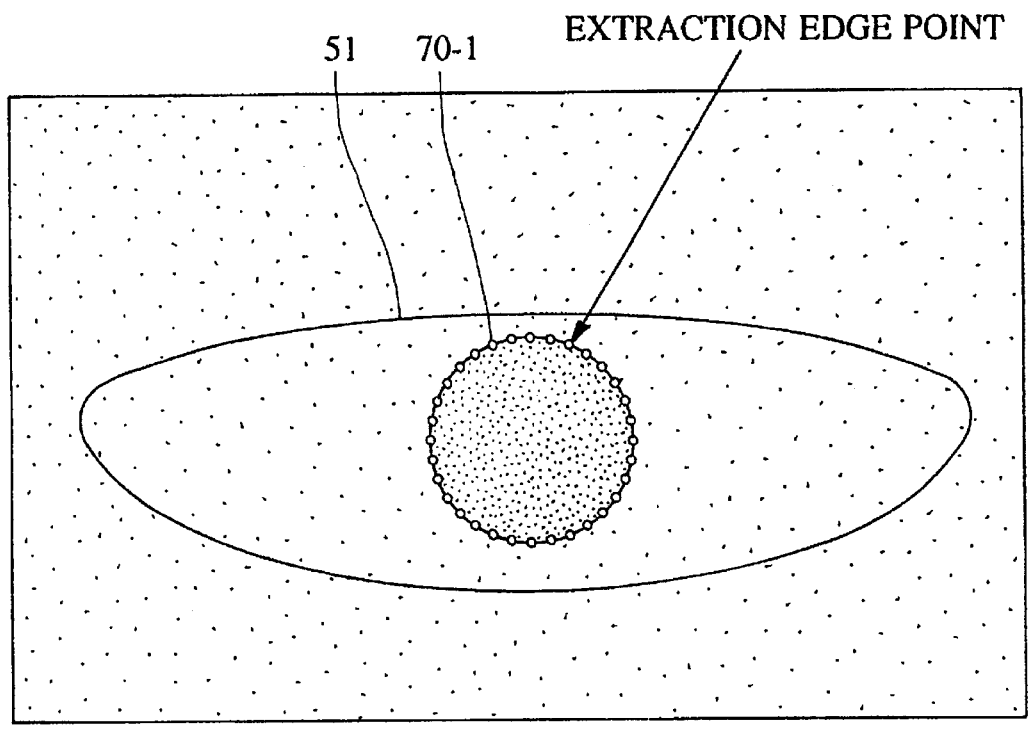
FIG. 22 is a diagram for illustrating the operation of estimating pupillary circle by the least-square method on the basis of the difference in luminance between pupil and iris.
Figure 22B:
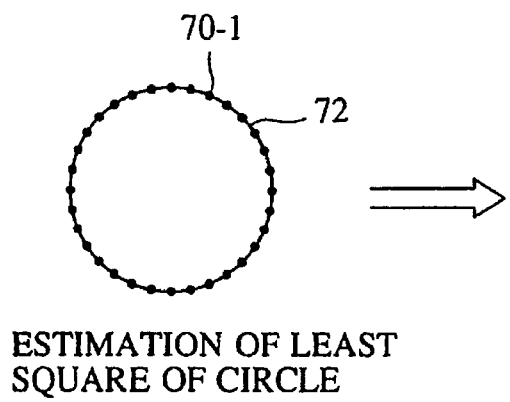
Figure 22C:
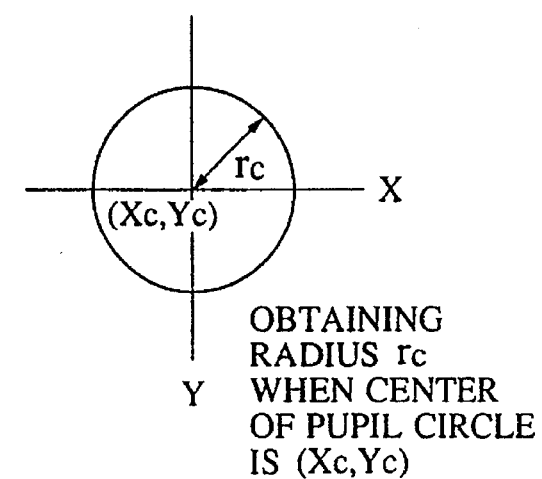

In Step (#401), based on the Purkinje image position range information, previously described in the subroutine "Purkinje image detection", more specifically IP1 to IP2 for the horizontal dimension (X axis) and JP1 to JP2 for the vertical dimension (Y axis), the pupil coordinate ranges IS1, IS2, JS1, and JS2 are calculated in accordance with the following formulas:

$IS1 \leftarrow IP1-20$ $IS2 \leftarrow IP2+20$ $JS1 \leftarrow (JP1+JP2)/2-20$ $JS2 \leftarrow (JP1+JP2)/2+40$ The most probable actual pupil edge points are set as points existing within the horizontal dimension (X axis) range of the area sensor, IS1 to IS2, and the vertical dimension (Y axis) range, JS1 to JS2. In the optical system of the embodiment, as illustrated in FIG. 21(A), the two Purkinje images are such that they always exist within and at the upper portion of the pupil, from which the aforementioned formulas are established.

When the computation of Step (#401) is completed, the process proceeds to Step (#402) and the returning step in the subroutine "set estimated pupil range" is executed.

Referring back to the flowchart in FIG. 7, the next subroutine "detect pupil center" of Step (#014) is called.

Figure 12:
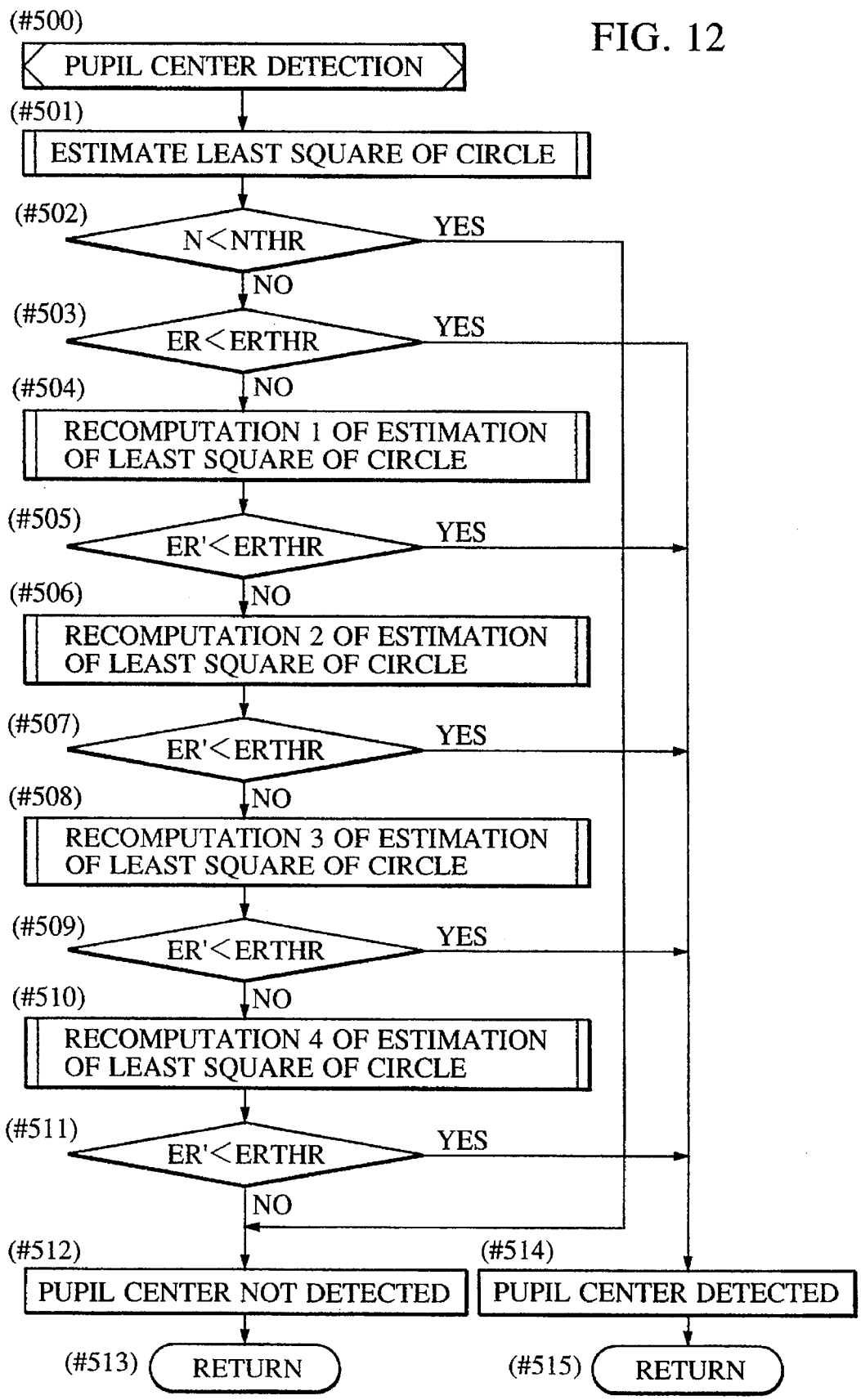
FIG. 12 is a flowchart showing the subroutine "pupillary center detection" to be executed by the line-of-sight detecting device of the first embodiment of the present invention.
Figure 13:
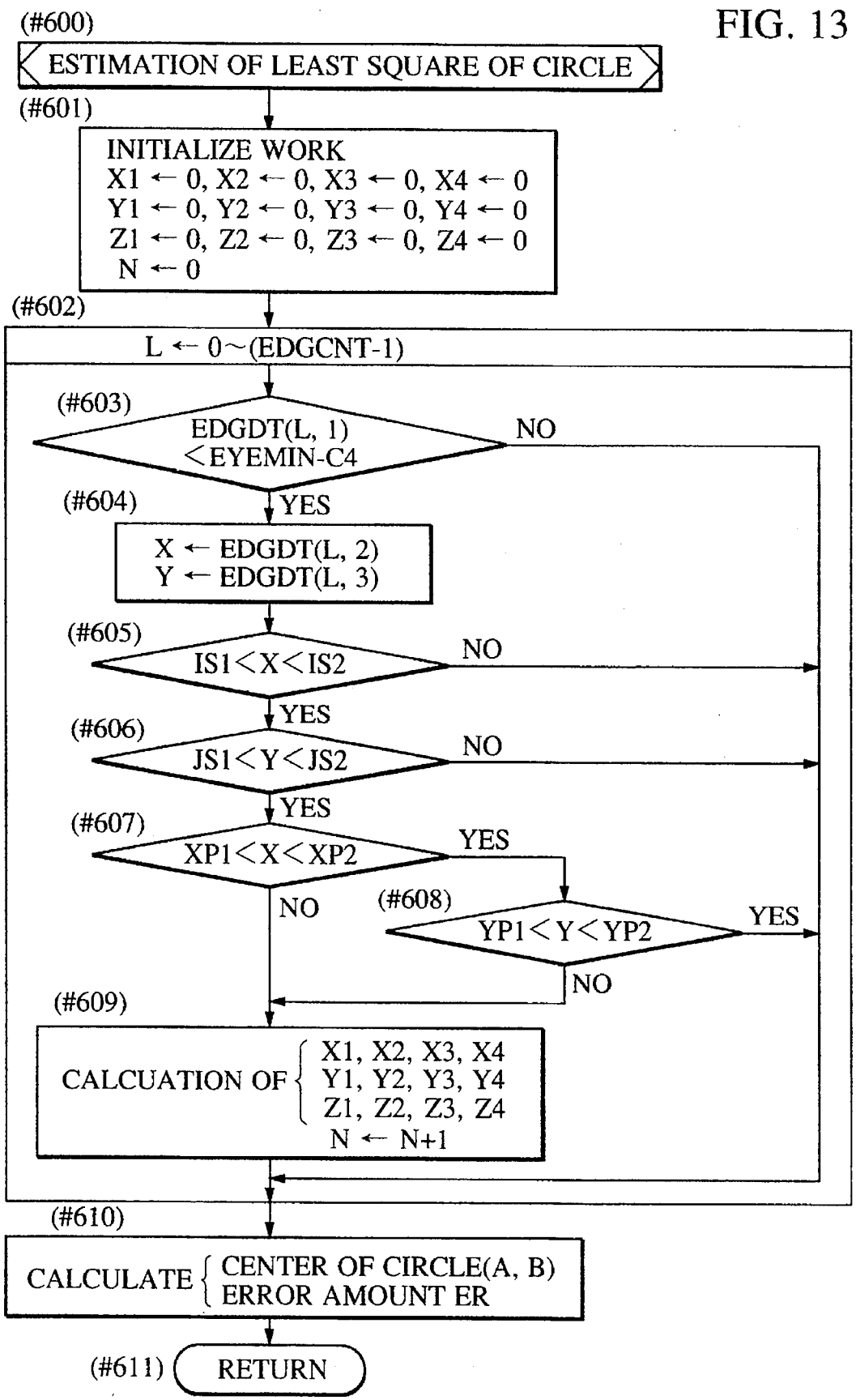
FIG. 13 is a flowchart showing the subroutine "estimation of least square of circle" to be executed by the line-of-sight detecting device of the first embodiment of the present invention.

In the subroutine "pupil center detection", the shape of the pupillary circle (center coordinates and size) are estimated from the coordinates of the most probably actual edge points. The subroutine is illustrated in the flowcharts of FIGS. 12 to 14.

In estimating the shape of the pupillary circle, the method of least squares is used, which is described below.

It is well known, with the center coordinates defined as (a, b) and the radius defined as c, the pupillary circle formula is expressed by equation (10):

$$(x-a)^2+(y-b)^2=c^2 \qquad (10)$$

From a plurality of observation points (x1, y1), (x2, y2), ..., (xn, yn), a, b, and c are determined such that the error amount ER of the following equation becomes a minimum.

$$ER=\Sigma[(xI-a)^2+(yI-b)^2-c2]^2 \qquad (11)$$

ER is equal to the sum of squares of the distances (error) along the normal dimension between the observation points and the circle determined by a, b, and c, and is made a minimum.

ER is partially differentiated with respect to each of a, b, and c (=0).

$$(\partial ER/\partial a)=\Sigma[-4(xI-a)^3-4(xI-a)\cdot(yI-b)^2+4c^2(xI-a)]=0 \qquad (12)$$

$$(\partial ER/\partial b)=\Sigma[-4(yI-b)^3-4(xI-a)^2\cdot(yI-b)+4c^2(xI-b)]=0 \qquad (13)$$

$$(\partial ER/\partial c)=\Sigma[4c^3-4(yI-b)^2c-4c(xI-a)^2]=0 \qquad (14)$$

where, I=I~n. From the aforementioned equation (14) is obtained $$c^2=\{\Sigma[(xI-a)^2+(yI-b)^2]\}/n \qquad (15)$$

The aforementioned equation (15) is substituted into the equations (13) and (14), wherein $X1=\Sigma xI,\ x2=\Sigma xI^2,\ x3=\Sigma xI^3$ \qquad (16)-(18)

$Y1=\Sigma yI,\ Y2=\Sigma yI^2,\ Y3=\Sigma yI^3$ \qquad (19)-(21)

$Z1=\Sigma xIyI,\ Z2=\Sigma xI^2yI,\ Z3=\Sigma xIyI^2$ \qquad (22)-(24)

and $V1=X2-X1^2/n$ \qquad (25)

$V2=Y2-Y1^2/n$ \qquad (26)

$W1=X3+Z3$ \qquad (27)

$W2=Y3+Z3$ \qquad (28)

$W3=(X2+Y2)/n$ \qquad (29)

$W4=Z1-X1Y1/n$ \qquad (30)

$W5=(Z1-2\cdot X1Y1/n)Z1$ \qquad (31)

$W6=X1Y2$ \qquad (32)

$W7=X2Y1$ \qquad (33)

then, the pupillary circle center coordinates a and b are calculated by the following equations (34) and (35)

$a=\{W1V2-W2W4-(W6-Y1Z1)W3\}/\{2(X2V2-W5-W6X1/n)\}$ \qquad (34)

$b=\{W2V1-W1W4-(W7-X1Z1)W3\}/\{2(Y2V1-W5-W7Y1/n)\}$ \qquad (35)

Although not directly related to the line-of-sight (gazing point) calculation, the radius c is calculated by equation (36):

$$c=[W3-2(aX1+bY1)/n+a^2+b^2]^{1/2} \qquad (36)$$

In the embodiment of the present invention, the error amount ER is further used to determine the reliability of the pupil center detection, and is determined by the following equation (37):

$ER = X4 - 4aX3 + 2(2a^2 + d)X2 - 4adX1 + Y4 - 4bY3 +$ \qquad (37)

$\qquad 2(2b^2 + d)Y2 - 4bdY1 + 2(Z4 - 2aZ3 - 2bZ2 + 4abZ1) + d^2n$ where, $X4=\Sigma xI^4$ \qquad (38)

$Y4=\Sigma yI^4$ \qquad (39)

$Z4=\Sigma xI^2yI^2$ \qquad (40)

$d=a^2+b^2-c^2$ \qquad (41)

With the support of such computations, the flowcharts of FIGS. 12 to 14 are described.

A description will be made of the subroutine "detect pupil center" with reference to the flowchart of FIG. 12.

When the subroutine "detect pupil center" is called, the process proceeds to Step (#500), followed by calling of subroutine "estimation of least square of circle" of Step (#501).

The subroutine "estimation least square of circle" is used to calculate pupil center coordinates (a, b) and error amount ER in accordance with the aforementioned equations, and is illustrated in the flowchart of FIG. 13. This subroutine is further used for checking the minimum luminance value and eliminating false pupil edges produced by Purkinje images.

When the subroutine "estimation of least square of circle" is called, the process proceeds from Step (#600) to Step (#601).

In Step (#601), initialization is performed on the aforementioned least square estimation equation work variables.

Step (#602) is a loop processing step in which variable L is made into a loop variable, and is the step for performing the first half of the least square method computation based on the stored pupil edge information.

At present, (EDGCNT-1) number information is stored in arrayed variable EDGDT as pupil edge points. The loop variable L indicates the order in which these are stored.

In the first step (#603) within the loop processing, a comparison is made between the Lth edge point luminance value EDGDT (L, 1) and (EYEMIN+C4). If the luminance value is greater, the process branches to end the current loop variable L processing.

In the embodiment, since the processing is carried out sequentially while photo-electric conversion signals from the area sensor are being read, the minimum luminance value employed at the part the edge point that has been detected is merely the minimum luminance value up to the time of the edge detection. On the other hand, it is possible that some of the points detected as edge points are not those actually having the minimum luminance value, so that they are not actually proper edge points. Accordingly, the purpose of this step is to determine, once more, based on the finally determined minimum luminance value, the minimum luminance value and to remove points considered improper as pupil edge points.

In Step (#603), when it is determined that the luminance value is small, the process proceeds to Step (#604) wherein the horizontal dimension (X-axis) coordinate and the vertical dimension (Y-axis) coordinate are temporarily stored in the data form of variables X and Y, respectively.

In the next Step (#605), a determination is made as to whether or not the horizontal dimension coordinate X of the Lth edge point falls within the horizontal dimension range IS1 to IS2. IS1 and IS2 are values obtained in the subroutine "set estimated pupil range". When there are edge points which do not fall within this range, the process branches so that these points are not recognized as pupil edge points and the current loop variable L processing is completed.

In the next Step (#606), the same determination is made for the vertical dimension coordinate.

When the Lth edge point falls within the pupil estimation range, the process proceeds to Step (#607).

In Steps (#607) and (#608), a determination is made as to whether the Lth edge point coordinate is located near the Purkinje images.

XP1, XP2, YP1, and YP2 have been determined in the subroutine "Purkinje image detection" of Step (#401). When the edge point coordinates fall within edge point coordinate horizontal dimension range XP1~XP2 and the vertical dimension range YP1~YP2, the process branches to end the current loop variable L processing. This is done to remove the detected false pupil edges in the optical system of the embodiment, since the two images exist in the upper portion of the pupil, the "bottom" portion of the spot-like Purkinje images often meets the aforementioned pupil edge conditions.

Edge point coordinate information satisfying the conditions in the aforementioned Steps (#603) to (#608) are used in the least square method computation in Step (#609).

In the computation of Step (#609), the aforementioned equations (16) to (24) and (38) to (40) are used and, further, the number of edge points N used in the computation is counted.

When all of the stored (EDGCNT-1) number of edge points are processed by the loop processing of Step (#602), the process proceeds to Step (#610).

In Step (#610), computations are made using the aforementioned equations (25) to (35) and (37) to (41) to obtain the pupil center coordinates (a, b) and error amount (ER).

The process proceeds to the next Step (#611) and the returning step in the subroutine "estimation of least square of circle" is executed.

Returning to FIG. 12, when the subroutine (estimation of least square of circle) is completed, the process proceeds to the next Step (#502).

In Step (#502), the number of data points used for circle estimation is compared with threshold value NTHR. If N<NTHR, the detection result is considered as not being very reliable since the quantity of data is small, so that the process branches to Step (#512) to indicate that the pupil center is not detected.

NTHR is equal to, for example, 30.

In Step (#502), if N≧NTHR, the process proceeds to the next Step (#503) and a comparison is made between the error amount ER and the threshold value ERTHR. If ER<ERTHR, the detection result is considered sufficiently reliable with a small amount of error, and the process branches to Step (#514) to indicate that the pupil center is detected.

The threshold value ERTHR may be, for example, 10000.

In Step (#503), if ER≧ERTHR, it is considered that although there is a sufficient quantity of data, the error amount is too large, and recomputations of Step (#504) and onwards are executed. A reason for a large error amount may be the inclusion of false edge points (or points other than those of the pupillary circle) in the computation.

In Step (#504), the subroutine "recomputation 1 of estimation of least square of circle" is performed.

The subroutine "recomputation 1 of estimation of least square of circle: recomputation 1" is a subroutine for eliminating the edge points existing at the upper portion along the vertical dimension of the area sensor, which accounts for one-fifth of the edge points used in the least square estimation calculation. Subroutine (#504) to recompute the minimum square estimation. This subroutine is illustrated in the flowchart of FIG. 14(A).

When the subroutine "recomputation 1 of estimation of least square of circle" is called, the process proceeds from Step (#700) to the next Step (#701) wherein variable storage is performed as shown in the figure.

Variables XS1 to ZS4 are used to store work variable values corresponding to all the edge points computed in Step (#501). The number of edge points to be removed is set at one-fifth the total number N of edge points, and is stored in the data form of variable M.

In the next Step (#702), computation work is initialized as in Step (#601) and, the process proceeds to Step (#703). The step (#703) is a loop processing that repeats itself from the step (#704) to the step (#706) until the loop variable L reaches (EDGCNT-1). In Step (#703), loop processing is performed as in Step (#602), wherein the least square method computation is performed to determine the edge points to be removed.

In the embodiment, reading of the area sensor is performed from the upper portion along the vertical dimension, so that edge points are stored from those at the upper portion along the vertical dimension in the data form of arrayed variable EDGDT (m, K). Therefore, counting up the m of EDGDT (m, K) from zero allows edge points to be taken out from those on the vertical dimension.

In the first Step (#704) in the loop processing of Step (#703), a determination is made as to whether an edge point (X, Y) is effective as a pupil edge. This step is exactly the same as Steps (#603) to (#608).

When the edge point is determined as being effective as a pupil edge point, the process proceeds to Step (#705) wherein the same calculation as that in Step (#609) is executed.

In the next Step (#706), a comparison is made between the number N of newly calculated edge points and the number M of edge points to be excluded. When the number N of newly calculated edge points is greater than the number M of edge points to be excluded, the process branches to outside of the processing loop of Step (#703). That is, the loop processing of Step (#703) is ended in this case even if the counter L has not reached a value of (EDGCNT-1). On the other hand, when the number of calculated edge points has not reached the M number of edge points to be excluded, the loop variable L is incremented and the processing loops back to Step (#704).

When the computation for the M number of edge points is completed, the process branches to Step (#708) to recompute the pupil center (a, b) and error amount ER', using the following equations (16') to (40'):

$$X1 = X1S - X1 \quad (16')$$
$$X2 = X2S - X2 \quad (17')$$
$$X3 = X3S - X3 \quad (18')$$
$$Y1 = Y1S - Y1 \quad (19')$$
$$Y2 = Y2S - Y2 \quad (20')$$
$$Y3 = Y3S - Y3 \quad (21')$$
$$Z1 = Z1S - Z1 \quad (22')$$
$$Z2 = Z2S - Z2 \quad (23')$$
$$Z3 = Z3S - Z3 \quad (24')$$
$$X4 = X4S - X4 \quad (38')$$
$$Y4 = Y4S - Y4 \quad (39')$$
$$Z4 = Z4S - Z4 \quad (40')$$

When recomputations are performed using equations (25) to (35) and (37) to (41), a new pupil center (a, b) and error amount ER' are obtained. Since equations (16) to (40) are originally in a sequential format, it is not necessary to recompute all of the data. Addition (or power addition) of data to be eliminated is performed, and this result is subtracted from the original value.

When the recomputation is completed, the process proceeds to Step (#709) and the returning step in the subroutine "recomputation 1 of estimation of least square of circle" is executed.

Referring back to FIG. 12, when Step (#504) is completed, the process proceeds to Step (#505) and a comparison is made between the recomputed error amount ER' and threshold value ERTHR. When ER' is smaller, this indicates that the data has been successively eliminated, so that the process branches to Step (#514) to indicate that the pupil center has been successfully detected.

When the error amount ER' is still larger, the process proceeds to Step (#506) and a different subroutine "recomputation 2 of estimation of least square of circle" is called.

Figure 14B:
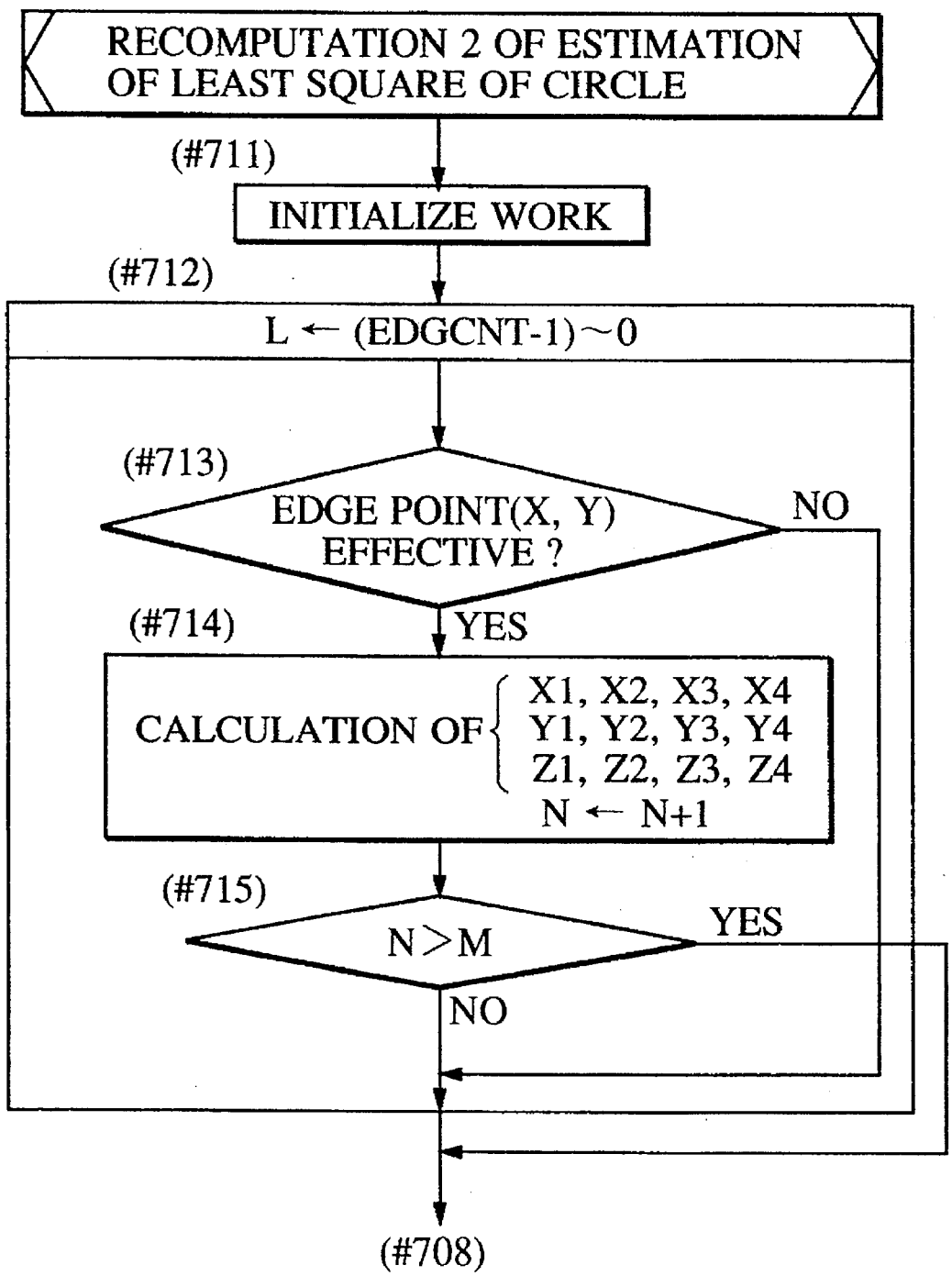
FIG. 14 (consisting of FIGS. 14(A) through 14(D)) is a flowchart showing the subroutine "recomputation 1~4 for estimating least square of circle" to be executed by the line-of-sight detecting device of the first embodiment of the present invention.

The "recomputation 2 of estimation of least square of circle" is a subroutine for eliminating the edge points existing at the lower portion along the vertical dimension of the area sensor, which accounts for one-fifth of the edge points used in the least square estimation calculation, to recompute the minimum square estimation. This subroutine is illustrated in the flowchart of FIG. 14(B).

"Recomputation 2" is almost the same as "recomputation 1". It differs from "recomputation 1" in that edge points from those at the lower part along the vertical dimension are removed, so that in Step (#712) loop variable L is counted down from (EDGCNT-1). Accordingly, the step (#712) is a loop processing that repeats itself from the step (#713) to the step (#715) until the loop variable L reaches from (EDGCNT-1) to 0. Description of the other processes will be omitted since they are exactly the same as those of "recomputation 1".

Referring back to FIG. 12, the description is continued.

When the subroutine "recomputation 2 of estimation of least square of circle" is completed, the process proceeds to Step (#507) and a comparison is made between the error amount ER' and threshold value ERYTHR. When ER' is smaller, this indicates that edge point elimination has been effectively performed, and the process branches to Step (#514) to indicate that the pupil center has been successively detected.

When the error amount ER' is still larger, the process proceeds to Step (#508) to call a different subroutine "recomputation 3 of estimation of least square of circle".

The "recomputation 3 of estimation of least square of circle" subroutine is a subroutine for eliminating the edge points existing at the left portion along the vertical dimension of the area sensor, which accounts for one-fifth of the edge points used in the least square estimation calculation, to recompute the minimum square estimation. This subroutine is illustrated in the flowchart of FIG. 14(C).

When the subroutine "recomputation 3" is called, the process proceeds from Step (#720) to Step (#721) wherein the edge information stored in the data form of arrayed variable EDGDT (m, k) are rearranged.

As described earlier, since edge points are stored in the data form of EDGDT (m, k) starting from those along the vertical dimension of the area sensor, processing is conducted based on edge points along the horizontal dimension, so that it is necessary to rearrange data stored in the data form of EDGDT.

Since horizontal dimension (X-axis coordinate) values of the edge points are stored in the data form of EDGDT (m, 2), performing the conventionally known sorting with respect to this value allows restoring of edge points from those at the left along the horizontal dimension in the data form of EDGDT.

When re-arranging of data is executed, the process branches to Step (#702). Thereafter, performing the exact same processing as those of "recomputation 1" allows recomputation with edge points on the left and right sides along the horizontal dimension of the area sensor to be eliminated.

Referring back to FIG. 12, when subroutine "recomputation 3 of estimation of least square estimate of circle" of Step (#508) is completed, the process proceeds to Step (#509) and a comparison is made between the recomputed error amount ER' and threshold value ERTHR. When ER' is smaller than ERTHR, this indicates that the data has been successively eliminated, so that the process branches to Step (#514) to indicate that the pupil center has been successively detected.

When the error amount ER' is still larger, the process proceeds to Step (#510) and a different subroutine "recomputation 4 of estimation of least square of circle" is called.

The "recomputation 4 of estimation of least square of circle" subroutine is a subroutine for eliminating the edge points existing at the right portion along the vertical dimension of the area sensor, which accounts for one-fifth of the edge points used in the least square estimation calculation, to recompute the minimum square estimation. This subroutine is illustrated in the flowchart of FIG. 14(D).

At present, since edge points from those at the left along the horizontal dimension are stored in the data form of arrayed variable EDGDT (m, k), if the edge points are eliminated from those at the right, EDGDT (m, k) can be handled in the same way as in "recomputation 2". Accordingly, when the subroutine "recomputation 4" is called, the Step (#711) immediately branches to Step (#711), so that the same processing as those of "recomputation 2" are performed.

Referring back again to FIG. 12, when the subroutine "recomputation 4 of estimation of least square of circle" of Step (#510) is completed, the process proceeds to Step (#511) and a comparison is made between the recomputed error amount ER' and threshold value ERTHR. If ER' is smaller than ERTHR, this indicates that the data has been effectively eliminated, so that the process branches to Step (#514) to indicate that the pupil center has been successfully detected.

When the error amount E' is still larger, the process proceeds to Step (#512) to indicate that the aforementioned operation was not effectively performed and that the pupil center was not detected.

When, in Step (#512) or Step (#514), the pupil center detection/non-detection is finally determined, the returning operation in the subroutine "pupil center detection" is executed in Step (#513) or Step (#515).

Referring back to FIG. 7, when "detect pupil center" is completed in Step (#014), the process proceeds to Step (#015) and the subroutine "line-of sight detection" is called.

When the returning operation in subroutine "detect pupil center" is executed in Step (#513), the process proceeds to Step (#016) and the series of operations are ended, without the subroutine "detect line-of-sight" being executed.

On the other hand, when the returning operation in the subroutine "pupil center detection" is executed in Step (#515), the subroutine "line-of-sight detection" is performed for detecting the line-of-sight (gazing point) based on the Purkinje image position and center of the pupil, detected by the processing performed up to this point.

Basically, as in the aforementioned conventional example, the angle of rotation of the eyeball optical axis is computed in accordance with equation (2).

In the first embodiment of the present invention, since the pupil center is detected two-dimensionally in the horizontal dimension (X axis) and vertical dimension (Y axis), it is possible to detect the pupil center based on the assumption that detection of the line of sight along the vertical dimension and that along the horizontal dimension are the same, unlike in the conventional example where only the line of sight in the horizontal dimension is performed.

When the detection of the line of sight is completed, the process proceeds to Step (#016) and the series of processing ends.

Figure 15:
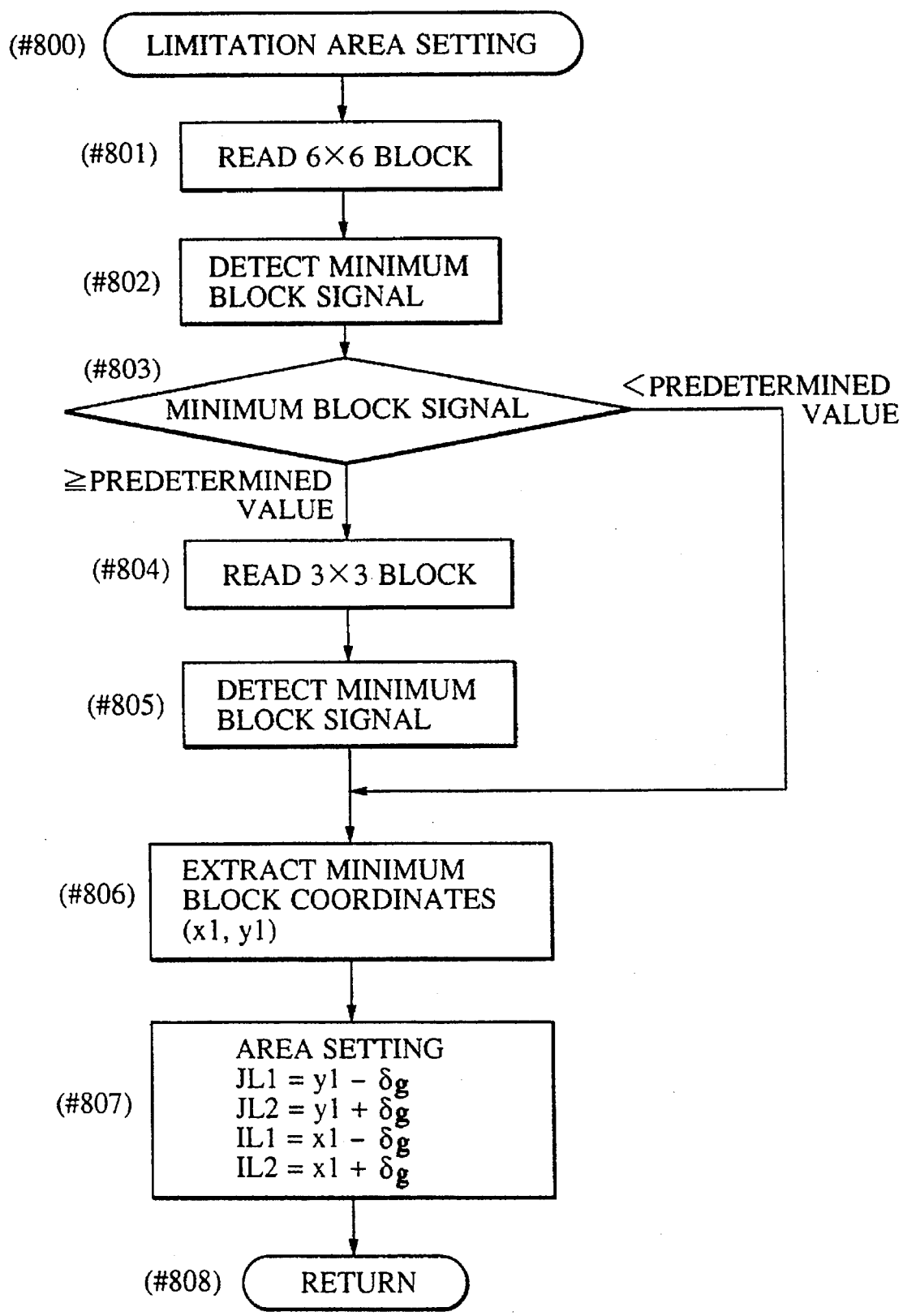
FIG. 15 is a flowchart showing the subroutine "limitation area setting" to be executed by the line-of-sight detecting device of the first embodiment of the present invention.
Figure 16:
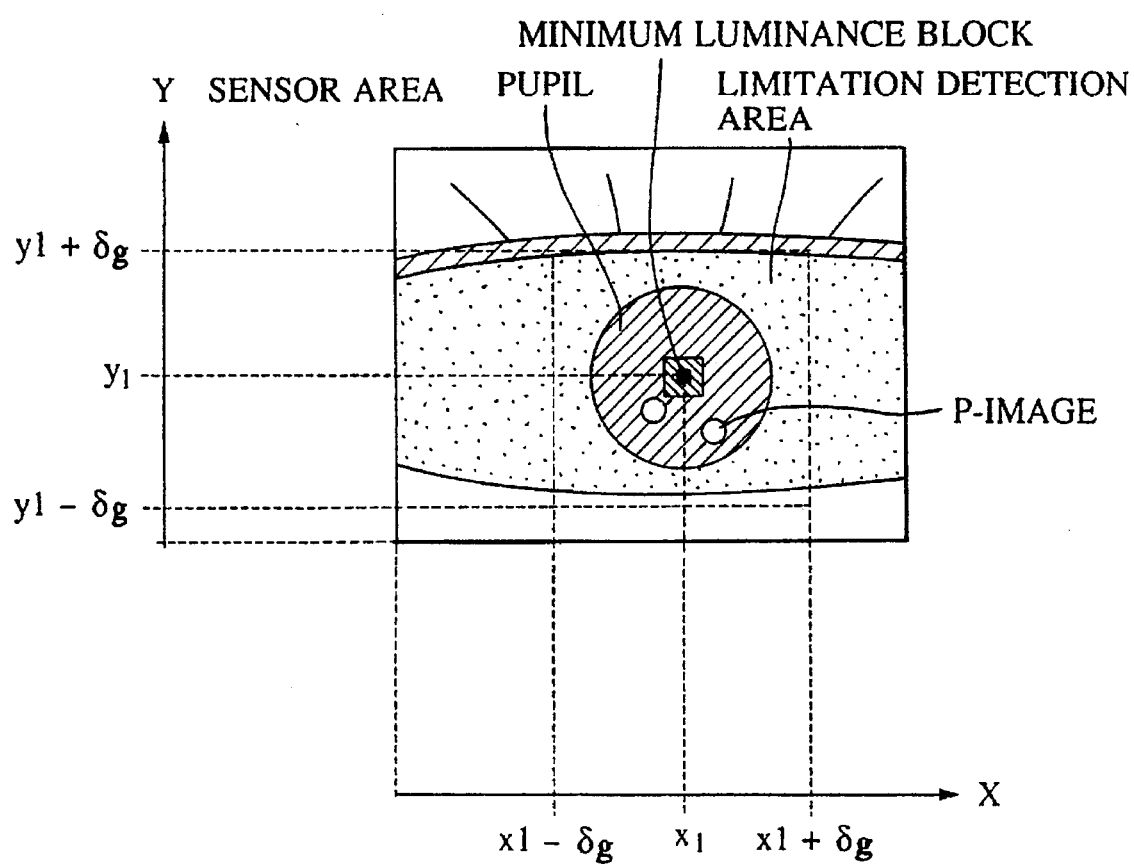
FIG. 16 is a diagram for supporting the description of the operation of the subroutine "limitation area setting" of FIG. 15.

In the first embodiment of the present invention, subroutine "set limitation area" of Step (#006), which is a characteristic subroutine, is described in the flowcharts of FIG. 15 and in FIG. 16.

When the subroutine "set limitation area" is called, the process proceeds from Step (#800) to Step (#801) and "6×6" block reading is performed. In Step (#801), which corresponds to the "4×4" block reading of the image sensor 16, described in FIGS. 4 to 6, signals of blocks with a large number of photo-electric conversion pixels are read.

In Step (#802), the block signal of the minimum block signal level value is detected from each of read block signals. Then, in Step (#803), a determination is made as to whether this minimum block signal is less than a predetermined value. Various values can be used as the predetermined value. It may be the largest absolute value level required to be recognized as the pupil, or a value equal to an average value of each of the block signals minus the predetermined value.

Here, when a determination is made that the minimum block signal is less than the predetermined value, a certain block area among each of the divided block areas of the area sensor is determined as being smaller than the pupil image and indicating the correct position of the pupil. The process then proceeds to Step (#806) in which minimum block coordinates are extracted.

In contrast, when, in Step (#803), a determination is made that the minimum block signal is larger than the predetermined value, it is possible that the pupil is smaller than the block area in size and that the minimum level block area is not indicating the correct pupil position. Therefore, "3×3" block reading is performed in Step (#804). In this step, which corresponds to the "2×2" block reading of the image sensor 14 of FIGS. 4 to 6, signals of blocks including a small number of photo-electric conversion pixels are read.

In Step (#805) the minimum block signal is detected from the block signals obtained from "3×3" block reading, and the process proceeds to Step (#806).

In Step (#806), the coordinates of the minimum block signal, obtained in Step (#805), is determined.

In Step (#807), a limitation area is set based on the minimum block coordinates. The idea behind this setting is described in FIG. 16, using an output image of the image sensor 14.

Referring to FIG. 16, although the observer's eyeball image is fixed within the output image of the image sensor 14, a minimum luminance level block is detected at the coordinates (x1, y1). These coordinates are undoubtedly located within the pupil, so that when the X-axis limitation detection area is set in the range of from (x1−∂g) to (x1+∂g) and the Y-axis limitation detection area is set in the range of from (y1−∂g) to (y1+∂g), the pupil fits completely into the limitation area. Accordingly, instead of performing A/D conversion and sequential processing on all of the pixels within the area of the image sensor 14, A/D conversion and sequential processing are performed only on the pixels within the limitation area to perform the aforementioned pupil and Purkinje image detections therewithin, which makes it possible to substantially speed up the line-of-detecting operation and increase reliability at the same time.

Referring back to FIG. 15, when the limitation area setting Step (#807) is completed, the process proceeds to Step (#808) and the returning operation in the subroutine is executed as described in FIG. 7, and pupil and Purkinje image detections are performed to detect the line of sight.

In the first embodiment, although the computation of Step (#807) of setting the limitation area from the minimum block coordinates, ±∂g area is uniformly set from the (x1, y1) coordinates, ∂g used for setting the area can be determined by roughly estimating the size of the pupillary circle based on the information regarding whether or not the block signal determined as the minimum level block signal is the minimum level for a "6×6" block signal or the minimum level for a "3×3" block signal. This further speeds up the line-of-detecting operation when the pupillary circle is small because of the reduced total number of pixels which need to be subjected to A/D conversion and sequential processing.

(Second Embodiment)

Figure 17:
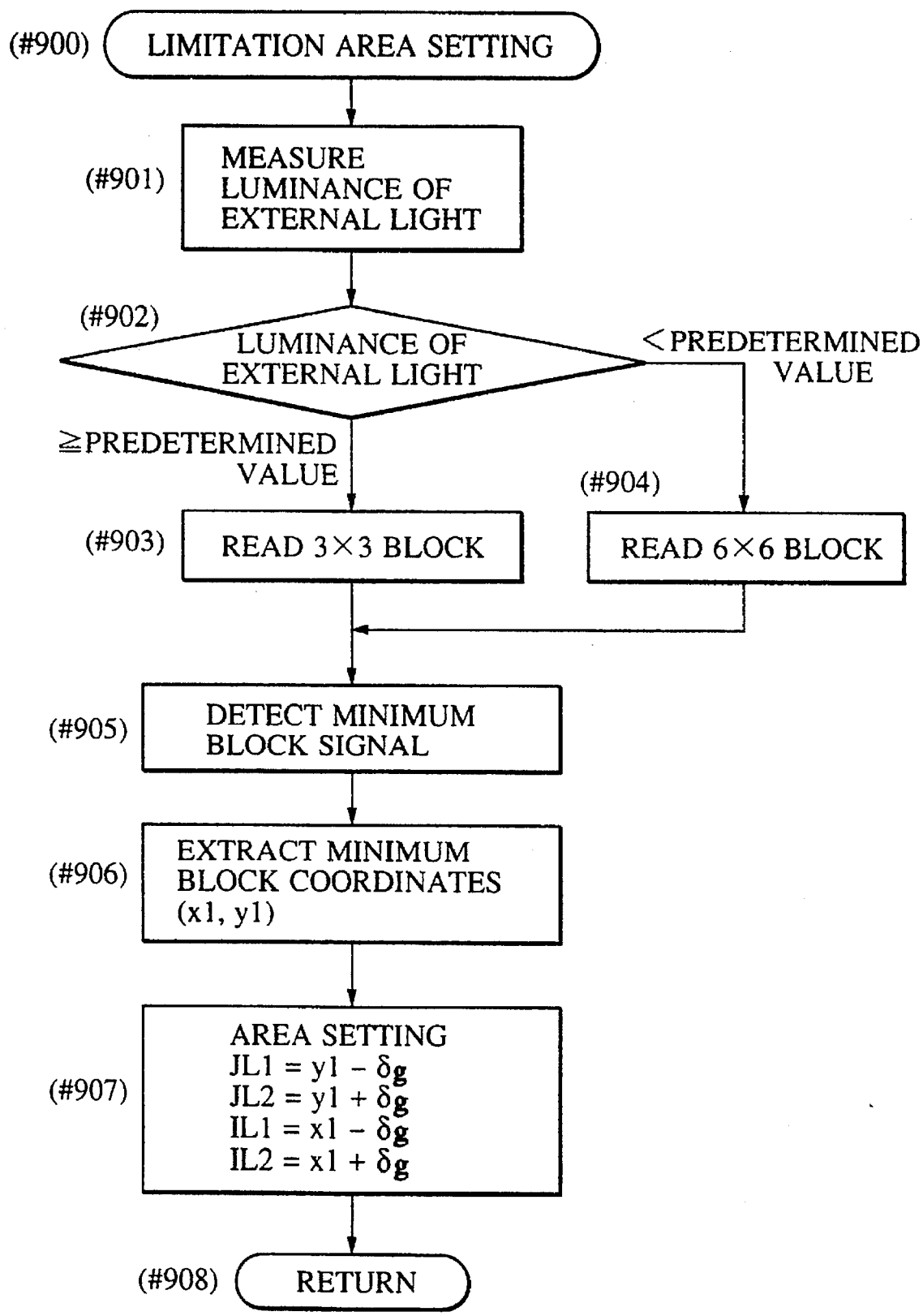
FIG. 17 is a flowchart showing the subroutine "limitation area setting" to be executed by the line-of-sight detecting device of the second embodiment of the present invention.

FIG. 17 is a flowchart of the operation of the line-of-sight detecting device of the second embodiment of the present invention and corresponds to the flowchart of the subroutine "limitation area setting". It is to be noted that the other operations and circuit arrangement of the line-of-sight detecting device are the same as those in the first embodiment, so that descriptions thereof will be omitted here.

When this subroutine "limitation area setting" is called, the process proceeds from Step (#900) to Step (#901) in which a measurement is made of the luminance of the external light. In this step, the luminance value of the external light is measured by the photometry circuit A102 and the photometry sensor 10 used for camera exposure control. The size of the observer's pupil is estimated, since the amount of light illuminating the observer's eyeball image is roughly equal to the amount of external light.

In Step (#902), the external light luminance is determined. If this value is greater than a predetermined value, it is estimated than the observer's pupil is small, and the process proceeds to Step (#903) for performing "3×3" block reading. This reading operation is similar to the reading operation of Step (#804) of FIG. 15.

On the other hand, if, in Step (#902), the external light luminance is less than the predetermined value, it is estimated that the observer's pupil is large, and the process proceeds to Step (#904) for performing "6×6" block reading. This reading operation is similar to the reading operation of Step (#801) of FIG. 15.

When Step (#903) or Step (#904) is completed, the process proceeds to Step (#905) and minimum block signal detection is performed. This detection operation is the same as the detection operation of Step (#802) or Step (#805) of FIG. 14.

Thereafter, in Step (#906), the coordinates of the minimum block signal are extracted in the next Step (#907), the limitation area is set. Then, the process proceeds to Step (#908) and the subroutine is ended. The operational flow of Steps (#906) to (#908) is the same as the operational flow of Steps (#806) to (#808) of FIG. 15.

As described above in the second embodiment of the present invention, block area setting is selected using the photometry sensor for measuring external light luminance, so that, as in the first embodiment, only one type, instead of two types, of a block signal needs to be read every time, with the result that line-of-sight detection operation is further speeded up.

In the second embodiment, although a TTL (through-the-lens) photometry sensor is used for measuring external light luminance, it is obvious that other instruments may also be used, such as other external-light sensors, photometric luminance utilizing sensors used in applications other than exposure control, which roughly measure external light luminance, and sensors used exclusively for measuring the luminance of regions around the eyeball, etc.

(Third Embodiment)

Figure 18:
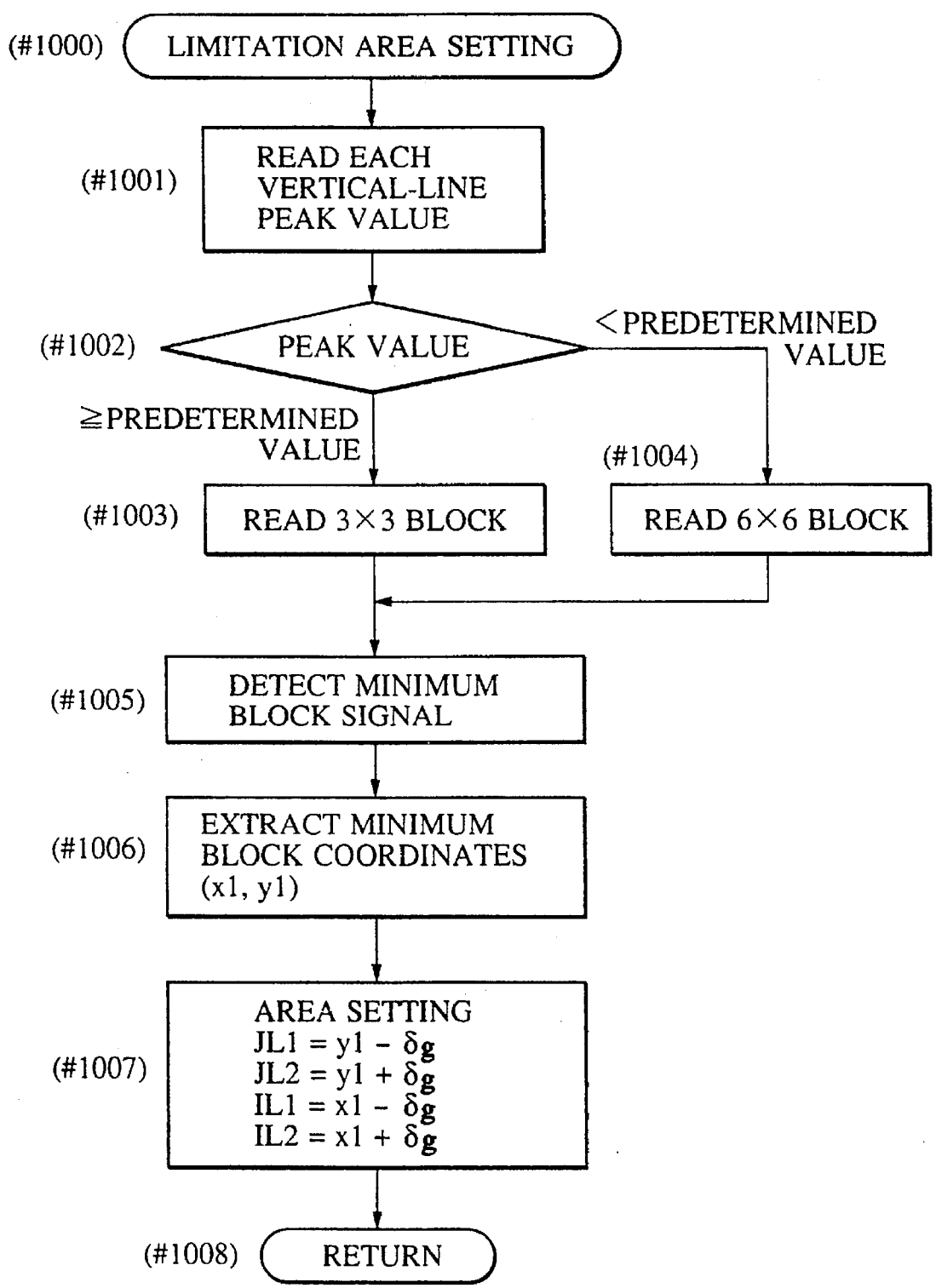
FIG. 18 is a flowchart showing the subroutine "limitation area setting" to be executed by the line-of-sight detecting device of the third embodiment of the present invention.
Figure 19:
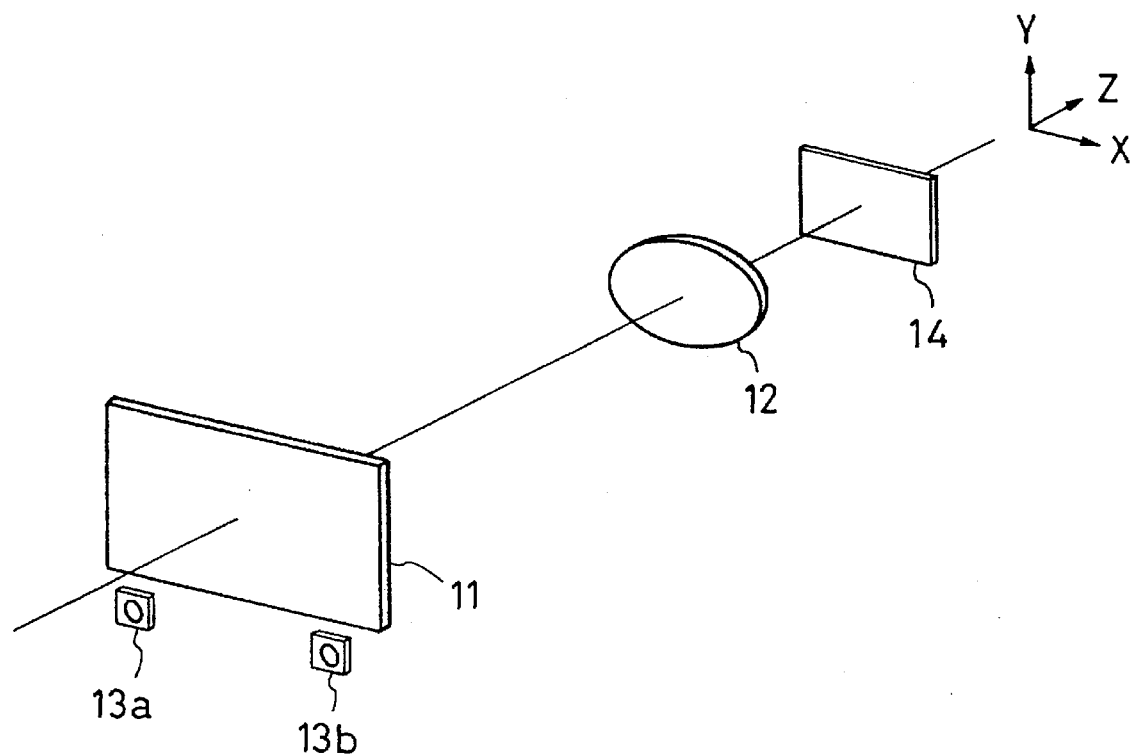
FIG. 19 is a perspective view showing a line-of-sight detection optical system with which ordinary line-of-sight detecting devices are equipped.

FIG. 18 is a flowchart of the operation of the line-of-sight detecting device of the third embodiment of the present invention and corresponds to the flowchart of the subroutine "limitation area setting" of FIG. 15 in the first embodiment. It is to be noted that the other operations and circuit arrangement of the line-of-sight detecting device are similar to those in the first embodiment, so that descriptions thereof will be omitted here.

When this subroutine "limitation area setting" is called, the process proceeds from Step (#1000) to Step (#1001) in which each vertical-line peak value is read by the image sensor 14. This reading operating corresponds to the V-Line peak reading described in FIGS. 4 to 6.

In the next Step (#1002), a determination is made of the read peak values. When the average output of each of the peak values is greater than a predetermined value, the observer's eyeball image is illuminated by a bright light, so that it is assumed that the pupil is small. Then, in Step (#1003), the "3×3" block reading is performed. This reading operation is similar to the reading operation of Step (#804) in FIG. 15.

If, in Step (#1002), an average output of the peak values is lower than the predetermined value, it is estimated that the observer's pupil is large, and the process proceeds to Step (#1004) for performing the "6×6" block reading. This reading operation is the same as the reading operation of Step (#801) of FIG. 15.

When either Step (#1003) or Step (#1004) is completed, the process proceeds to Step (#1005) and minimum block signal detection is performed. This detection operation is similar to the detection operation of Step (#802) or Step (#805) of FIG. 15.

Thereafter, in Step (#1006), the minimum level block coordinates are extracted. Then, in the next Step (#1007), the limitation area is set. The process, then, proceeds to Step (#1008) in which the subroutine ends. Here, the operation flow of Steps (#1006) to (#1007) is similar to the operational flow of Steps (#806) to (#808) of FIG. 15.

Accordingly, in the third embodiment of the present invention, before block reading is performed, the peak output of each line is read and based on this information the size of the pupil is estimated to select the block area setting. Therefore, as in the aforementioned second embodiment, only one type, instead of two types, of block signals needs to be read every time. In addition, it becomes unnecessary to perform some other control operation such as photometric value reading, which can be inconvenient during the line-of-sight detection routine as is required in the aforementioned second embodiment, so that the line-of-sight detecting operation can be further speeded up.

In the third embodiment, although the image sensor 14 block regions are divided into "6×6" blocks or "3×3" blocks, the same advantages can be obtained when the number of horizontal pixels and the number of vertical pixels are not the same as when they are divided into "6×7" blocks or "3×4" blocks.

According to each of the embodiments, the image sensor 14 area onto which the eyeball image of the photographer (observer) looking through the eyepiece section is divided into a plurality of block areas of roughly the same size. Based on the block signals, a limitation area is set within the aforementioned sensor area. Then, signal processing is performed based on the photoelectric conversion signal in this area. In the line-of-sight detecting device for detecting the line of sight of the observer, means for selecting the block area division type is selected from a plurality of block area division types, by which means the size of the photographer's pupil image on the image sensor 14 is, according to the situation, estimated and selected.

This allows, according to whatever situation in which the eyeball image is in, selection of the most suitable block area and quick limitation of the area where pupillary circle and Purkinje image detections are to be performed. Therefore, the device allows achievement of highly reliable line-of-sight detections within a substantially reduced amount of time.

In the embodiment, IRED 13a to 13f may serve as the illuminating means of the present invention, the image sensor 14 may serve as the light-receiving means of the present invention, the CPU A100 may serve as the limitation area setting means of the present invention, and the CPU A100 and line-of-sight detection circuit A101 may serve as the line-of-sight detection means of the present invention.

The photometry sensor 10 and photometry circuit may serve as the photometry means of the present invention.

Such is the structural relationship of the described embodiment and the present invention. However, the present embodiment is not limited to the structures of these embodiments. It is apparent that the invention may be of any structure as long as the functions specified in the claims or the functions in the embodiments can be realized.

The following modifications also are contemplated:

In the first embodiment of the present invention, in the calculation of Step 9 (#807) of setting the limitation area from the minimum block coordinates, the ±∂g area is uniformly set from the (x1, y1) coordinates. However, the size of the pupillary circle can be roughly estimated to determine the setting size of the ∂g area based on the information regarding whether the minimum level block signal is for the "6×6" block signal or for the "3×3" block signal. As a result, the total number of pixels to be subjected to A/D conversion and sequential processing is decreased, so that the line-of-sight detection can be further speeded up when the pupillary circle is small.

In the second embodiment, although a TTL photometry sensor is used for measuring external light luminance, it is obvious that other instruments may also be used, such as other external-light sensors and photometric luminance employing sensors used in applications other than exposure control which roughly measure external light luminance, and sensors used exclusively for measuring the luminance of regions around the eyeball, etc.

In the third embodiment, although the image sensor 14 block regions are divided into "6×6" blocks or "3×3" blocks, the same advantages can be obtained when the number of horizontal pixels and the number of vertical pixels are not the same as when they are divided into "6×7" blocks or "3×4" blocks.

In each of the described embodiments of the present invention, the circuit structure of the image sensor 14 is not limited to the structure of FIG. 4. An existing CCD circuit, etc., may be added to divide an area into blocks and to output these blocks. If the area can be divided in more than two ways, the same advantages can be achieved.

Although in the described embodiments the block signal is an average output of the pixels within the blocks, it may be the maximum or minimum output of the pixels in the blocks.

In addition, although in the described embodiments a block division type is chosen from two different division types, a division method may be made to be chosen from three different division types.

Although the present invention has been described as applied in a single-lens reflect camera, it may be applied in other cameras such as lens shutter cameras and video cameras. In addition, it may be applied in optical devices or other devices, and may be applied as a structural unit.

As described above, according to the present invention, block signals related to a photo-electric signal in the block area to be outputted is determined. A limitation area setting means for limiting the area within the sensor area based on each of the block signals is capable of functioning as means for selecting a combination of a plurality of photoelectric conversion elements forming the aforementioned block area from a different combination of numbers of these elements. This allows, according to the situation, estimation of the size of the observer's pupil image on the sensor area and selection of the block area.

With such an arrangement, it is possible to speed up the detection of the line-of-sight detection and to perform such detection with higher precision.

The individual components shown in outline or block in the Drawings are well-known in the line-of-sight detecting device arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention covers all modifications and equivalents within the spirit and scope of the appended claims. The scope of the claims is to be accorded the broadest interpretation so as to encompass all modifications and equivalent structures.

What is claimed is:

1. A line-of-sight detecting device comprising:
   a receiving sensor having a plurality of photoelectric conversion elements for receiving an image of an eyeball of a viewer;
   block area setting means for setting in said receiving sensor a plurality of block areas, each block area including a number of said plurality of photoelectric conversion elements, and each block area outputting a value on the basis of the output of the photoelectric conversion elements included in that block area;
   selection means for selecting a particular block area satisfying a predetermined condition based on the values output from the block areas; and
   line-of-sight detecting means for executing image processing at least on those photoelectric conversion elements which are included in the particular block selected by said selection means,
   wherein said block area setting means changes the number of photoelectric conversion elements constituting one block in response to a predetermined situation.

2. A line-of-sight detecting device according to claim 1, wherein said selection means selects a block area whose output value is a minimum output value as said particular block area.

3. A line-of-sight detecting device according to claim 1, further comprising photometry means for metering a quantity of light substantially incident upon the eyeball of the viewer, wherein said block area setting means changes a number of photoelectric conversion elements constituting each block area in accordance with the result of a metering by said photometry means.

4. A line-of-sight detecting device according to claim 1, wherein said block area setting means changes a number of photoelectric conversion elements constituting each block area in accordance with a reception preparing operation of said receiving means.

5. A line-of-sight detecting device according to claim 1, wherein said block area setting means changes a number of photoelectric conversion elements constituting each block area in accordance with the result of a gain setting operation of said receiving means.

6. A line-of-sight detecting device according to claim 1, wherein said line-of-sight detecting means performs image processing on the photoelectric conversion elements included in a predetermined range surrounding said particular block.

7. A line-of-sight detecting device according to claim 6, wherein the size of the range surrounding said particular block area changes in response to a predetermined condition.

8. A line-of-sight detecting device according to claim 7, wherein the size of the range surrounding said particular block area varies with a number of photoelectric conversion elements constituting each block area set by said block area setting means.

9. A line-of-sight detecting device comprising:

a receiving sensor having a plurality of photoelectric conversion elements for receiving an image of an eyeball of a viewer;

first selection means for setting, in said receiving means, a plurality of first block areas, each of said first block areas including a number of said plurality of photoelectric conversion elements, each of said plurality of first block areas outputting a value on the basis of the output of the photoelectric conversion elements included in the block area, and for selecting a first particular block area, satisfying a predetermined condition based on the values output from said plurality of first block areas;

second selection means which, when said first selection means determines that there is no first particular block area satisfying the predetermined condition among said plurality of first bock areas, sets, in said receiving sensor, a plurality of second block areas, each of said second block areas including a smaller number of photoelectric conversion elements as compared to each said first block area, each of said plurality of second block areas outputting a value on the basis of the outputs of the photoelectric conversion elements included in that block area, and selects a second particular block area, satisfying a predetermined condition based on the output values from said plurality of second block areas; and line-of-sight detection means for performing image processing at least on those photoelectric conversion elements which are included in one of said first and second particular block areas, respectively, selected by said first and second selection means.

10. A line-of-sight detecting device according to claim 9, wherein each of said first and second block areas outputs a value based on the output of said photoelectric conversion elements of one block area, said first and second selection means selecting that block area in which the output value is a minimum of said first and second particular block area output values.

11. A line-of-sight detecting device according to claim 9, wherein said line-of-sight detecting means performs image processing on the photoelectric conversion elements included in a predetermined range surrounding one of said first and second particular blocks.

12. A line-of-sight detecting device according to claim 11, wherein the range surrounding said first particular block area differs from the range surrounding said second particular block area in the size of the surrounding range.

13. A line-of-sight detecting device comprising:

a receiving sensor having a plurality of photoelectric conversion elements for receiving an image of an eyeball of a viewer;

first selection means for setting, in said receiving sensor, a plurality of first block areas, each of said first block areas including a number of said plurality of photoelectric conversion elements, each of said plurality of first block areas outputting a value on the basis of the output of the photoelectric conversion elements included in that block area, and for selecting a first particular block area satisfying a predetermined condition, based on the values output from said plurality of first block areas;

second selection means for setting in said receiving sensor, a plurality of second block areas, each of said second block areas including a smaller number of photoelectric conversion elements as compared to each said first block area, each of said plurality of second block areas outputting a value on the basis of the outputs of the photoelectric conversion elements included that block area, and for selecting a second particular block area satisfying the predetermined condition, based on the output values from said plurality of second block areas;

determination means for determining one of said first and second selection means in response to a predetermined situation; and line-of-sight detection means for performing image processing at least on those photoelectric conversion elements which are included in one of said first and second particular block areas respectively selected by said first and second selection means.

14. A line-of-sight detecting device according to claim 13, wherein each of said first and second block areas outputs a value based on the output of the photoelectric conversion elements of one block area, said first and second selection means selecting that block area in which the output value is a minimum of said first or second particular block area output values.

15. A line-of-sight detecting device according to claim 13, further comprising photometry means for metering the quantity of light incident upon the eyeball of the viewer, wherein said selection means selects one of said first and second selection means in accordance with the results of metering by said photometry means.

16. A line-of-sight detecting device according to claim 13, wherein said selection means selects one of said first and second selection means in accordance with a reception preparing operation of said receiving means.

17. A line-of-sight detecting device according to claim 13, said selection means selects one of said first and second selection means in accordance with the results of a gain setting operation of said receiving means.

18. A line-of-sight detecting device according to claim 13, wherein said line-of-sight detecting means performs image processing on the photoelectric conversion elements which are included in a predetermined range surrounding one of said first and second particular blocks.

19. A line-of-sight detecting device according to claim 18, wherein said predetermined range varies in the size of the range surrounding one of said first and second block area in accordance with the result of selection of said selection means.

20. An apparatus having a line-of-sight detecting device comprising:

a receiving sensor having a plurality of photoelectric conversion elements for receiving an image of an eyeball of a viewer;

block area setting means for setting in said receiving sensor a plurality of block areas, each block area including a number of said plurality of photoelectric conversion elements, and each block area outputting a value on the basis of the output of the photoelectric conversion elements constituting that block area;

selection means for selecting a particular block area satisfying a predetermined condition based on the values output from said block areas; and line-of-sight detecting means for executing image processing at least on those photoelectric conversion elements which are included in said particular block selected by said selection means, wherein said block area setting means changes the number of photoelectric conversion elements constituting one block area in response to another predetermined condition.

21. An apparatus having a line-of-sight detecting device according to claim 20, wherein said selection means selects a block area whose output value is a minimum value of said particular block area output values.

22. An apparatus having a line-of-sight detecting device according to claim 20, further comprising photometry means for metering a quantity of light substantially incident upon the eyeball of the viewer, wherein said block area setting means changes the number of said photoelectric conversion elements constituting each block area in accordance with the result of metering by said photometry means.

23. An apparatus having a line-of-sight detecting device according to claim 20, wherein said block area setting means changes the number of said photoelectric conversion elements in accordance with a reception preparing operation of said receiving means.

24. An apparatus having a line-of-sight detecting device according to claim 20, wherein said block area setting means changes the number of said photoelectric conversion elements in accordance with the result of a gain setting operation of said receiving means.

25. An apparatus having a line-of-sight detecting device according to claim 20, wherein said line-of-sight detecting means performs image processing on the photoelectric conversion elements included in a predetermined range surrounding said particular block.

26. An apparatus having a line-of-sight detecting device according to claim 25, wherein a size of said range surrounding said particular block area changes in response to a predetermined condition.

27. An apparatus having a line-of-sight detecting device comprising:

a receiving sensor having a plurality of photoelectric conversion elements for receiving an image of an eyeball of a viewer;

first selection means for setting, in said receiving sensor, a plurality of first block areas, each of said first block areas including a number of said plurality of photoelectric conversion elements, and each block area outputting a value of the photoelectric conversion elements included in that block area, and for selecting a first particular block area satisfying a predetermined condition, based on the values output from said plurality of first block areas;

second selection means which, when said first selection means determines that there is no first particular block area satisfying the predetermined condition among said plurality of first block areas, sets, in said receiving sensor, a plurality of second block areas, each of said second block areas including a smaller number of photoelectric conversion elements as compared to each said first block area, each of said plurality of second block areas outputting a value on the basis of the outputs of the photoelectric conversion elements included in that block area, and selects a second particular block area, satisfying the predetermined condition, based on output values from said plurality of second block areas; and line-of-sight detection means for performing image processing on those photoelectric conversion elements, which are included in one of said first and second particular block areas respectively selected by said first and second selection means.

28. An apparatus having a line-of-sight detecting device according to claim 27, wherein each of said first and second block areas outputs a value based on the output of said photoelectric conversion elements of one block area, said first and second selection means selecting that block area in which the output value is a minimum of said first and second particular block area output values.

29. An apparatus having a line-of-sight detecting device according to claim 27, wherein said line-of-sight detecting means performs image processing on the photoelectric conversion elements included in a predetermined range surrounding one of said first and second particular blocks.

30. An apparatus having a line-of-sight detecting device according to claim 29, wherein a size of the range surrounding said first particular block area differs from a size of the range surrounding said second particular block area in the size of the surrounding range.

31. A line-of-sight detecting device comprising:

a receiving sensor having a plurality of photoelectric conversion elements for receiving an image of an eyeball of a viewer;

block area setting means for setting in said receiving sensor a plurality of block areas each having a predetermined unit area, each block area including a number of said plurality of photoelectric conversion elements, and each block area outputting a value;

selection means for selecting a particular block area satisfying a predetermined condition, based on the values output from said block areas; and line-of-sight detection means for performing image processing at least on those photoelectric conversion elements which are included in said particular block area to thereby detect the line-of-sight of the viewer, wherein said block area setting means changes said unit area with which said receiving sensor is divided into said plurality of block areas in accordance with a predetermined situation.

32. A line-of-sight detecting device according to claim 31, wherein said selection means selects, out of said plurality of block areas, a block area outputting a minimum value as said particular block area.

33. A line-of-sight detecting device according to claim 31, further comprising a light measuring means for measuring the amount of light substantially incident on an eyeball of a viewer, wherein said block area setting means changes said unit area with which said receiving sensor is divided into said plurality of block areas in accordance with the result of the light measurement by said light measuring means.

34. A line-of-sight detecting device according to claim 31, wherein said block area setting means changes said unit area with which said receiving sensor is divided into said plurality of block areas in accordance with a preliminary receiving operation by said receiving sensor.

35. A line-of-sight detecting device according to claim 31, wherein said block area setting means changes said unit with which said receiving sensor is divided into said plurality of block areas in accordance with the result of a gain-setting operation by said receiving sensor.

36. A line-of-sight detecting device according to claim 31, wherein said line-of-sight detecting means performs image processing on the photoelectric converting elements included in the predetermined range surrounding said particular block area.

37. A line-of-sight detecting device according to claim 36, wherein the extent of the range surrounding said particular block area changes in accordance with the predetermined situation.

38. A line-of-sight detecting device according to claim 37, wherein the extent of the range surrounding said particular block area changes in accordance with said unit area with which said receiving sensor is divided into said plurality of block areas.

* * * * *

UNITED STATES PATENT AND TRADEMARK OFFICE
CERTIFICATE OF CORRECTION

PATENT NO. : 5,671,447
DATED : September 23, 1997
INVENTOR(S) : TATSUYUKI TOKUNAGA It is certified that error appears in the above-identified patent and that said Letters Patent is hereby corrected as shown below:

COLUMN 1:

Line 17, "applicant," should read --applicant),--; and
    Line 21, "allowed)," should read --allowed,--.

COLUMN 2:

Line 47, "$\delta x$ and $\delta y$" should read --$\delta X$ and $\delta Y$--.

COLUMN 5:

Line 67, "of" (first occurrence) should read --to--.

COLUMN 8:

Line 61, "is" (second occurrence) should read --are--.

COLUMN 9:

Line 33, "and" should be deleted.

UNITED STATES PATENT AND TRADEMARK OFFICE
CERTIFICATE OF CORRECTION

PATENT NO. : 5,671,447
DATED : September 23, 1997
INVENTOR(S) : TATSUYUKI TOKUNAGA It is certified that error appears in the above-identified patent and that said Letters Patent is hereby corrected as shown below:

COLUMN 10:

Line 47, "capacities" should read --capacitors--; and
    Line 58, "capacities" should read --capacitors--.

COLUMN 12:

Line 8, "light" should read --lights--.

COLUMN 21:

Line 65, "x2" should read --X2-- and "x3" should read --X3--.

COLUMN 34:

Line 8, "included" should read --included in--.

Signed and Sealed this

Nineteenth Day of May, 1998

Attest:

BRUCE LEHMAN

*Attesting Officer*    *Commissioner of Patents and Trademarks*